(12) United States Patent
Gomi et al.

(10) Patent No.: US 7,893,979 B2
(45) Date of Patent: Feb. 22, 2011

(54) SOLID-STATE IMAGER APPARATUS WHICH CARRIES OUT BOTH PROGRESSIVE SCANNING AND INTERLACE SCANNING IN ONE FRAME BY AN ARBITRARY COMBINATION, AND A CAMERA USING THE SOLID-STATE IMAGER APPARATUS

(75) Inventors: Yuichi Gomi, Hachioji (JP); Seisuke Matsuda, Hachioji (JP); Yukihiro Kuroda, Hachioji (JP); Keiichi Mori, Hachioji (JP)

(73) Assignee: Olympus Corporation, Tokyo (JP)

( * ) Notice: Subject to any disclaimer, the term of this patent is extended or adjusted under 35 U.S.C. 154(b) by 504 days.

(21) Appl. No.: 11/959,665

(22) Filed: Dec. 19, 2007

(65) Prior Publication Data
US 2008/0100733 A1      May 1, 2008

Related U.S. Application Data

(62) Division of application No. 10/910,779, filed on Aug. 3, 2004, now Pat. No. 7,528,872.

(30) Foreign Application Priority Data

Aug. 4, 2003    (JP)    ............................. 2003-285786
Aug. 5, 2003    (JP)    ............................. 2003-286775
Aug. 8, 2003    (JP)    ............................. 2003-206850

(51) Int. Cl.
*H04N 3/14*    (2006.01)
*H04N 5/335*    (2006.01)
(52) U.S. Cl. ....................... 348/304; 348/305
(58) Field of Classification Search ................. 348/303, 348/304, 305, 281
See application file for complete search history.

(56) References Cited

U.S. PATENT DOCUMENTS 6,512,858 B2 *    1/2003    Lyon et al. .................. 382/305

(Continued)

FOREIGN PATENT DOCUMENTS

JP    6-144594    5/1994

(Continued)

OTHER PUBLICATIONS

Notification of Reasons For Rejection for Japanese Patent Application No. 2003-285786, mailed May 12, 2009 (3 pgs.) with translation (3 pgs.).

(Continued)

*Primary Examiner*—Sinh Tran
*Assistant Examiner*—Albert H Cutler
(74) *Attorney, Agent, or Firm*—Straub & Pokotylo; John C. Pokotylo

(57) ABSTRACT

In an XY address type solid-state imager apparatus comprising a solid-state imager having a plurality of pixels two-dimensionally arranged, and horizontal and vertical scanning circuits to read signals of the pixels, the scanning circuits each have a progressive scanning circuit to progressively read pixel signals by a first scanning control signal, and an interlace scanning circuit to read pixel signals with an interlaced manner by a second scanning control signal different from the first scanning control signal, and arbitrarily carries out combining of progressive reading and interlace reading in one frame in accordance with a combination of the respective scanning control signals, and reads pixel signals.

2 Claims, 27 Drawing Sheets

U.S. PATENT DOCUMENTS

| | | | |
|---|---|---|---|
| 2003/0231253 A1* | 12/2003 | Kakumoto | 348/308 |
| 2008/0100734 A1 | 5/2008 | Gomi et al. | |
| 2009/0190020 A1 | 7/2009 | Gomi et al. | |

FOREIGN PATENT DOCUMENTS

| | | |
|---|---|---|
| JP | 08-182005 | 7/1996 |
| JP | 09-163208 | 6/1997 |
| JP | 09-224196 | 8/1997 |
| JP | 9-264967 | 10/1997 |
| JP | 10-243298 | 9/1998 |
| JP | 2000-032318 | 1/2000 |
| JP | 2000-092399 | 3/2000 |
| JP | 2001-285720 | 10/2001 |
| JP | 2002-165136 | 6/2002 |
| JP | 2003-017677 | 1/2003 |

OTHER PUBLICATIONS

Notification of Reasons For Rejection for Japanese Patent Application No. 2003-286775, mailed Nov. 25, 2008 (3 pgs.) with translation (3 pgs.).

Notification of Reasons For Rejection for Japanese Patent Application No. 2004-235953, mailed May 12, 2009 (3 pgs.) with translation (3 pgs.).

Notification of Reasons For Rejection for Japanese Patent Application No. 2003-206850, mailed May 19, 2009 (3 pgs.) with translation (4 pgs.).

Decision of Rejection for Japanese Patent Application No. 2003-285786, mailed Aug. 4, 2009 (2 pgs.) with translation (2 pgs.).

* cited by examiner

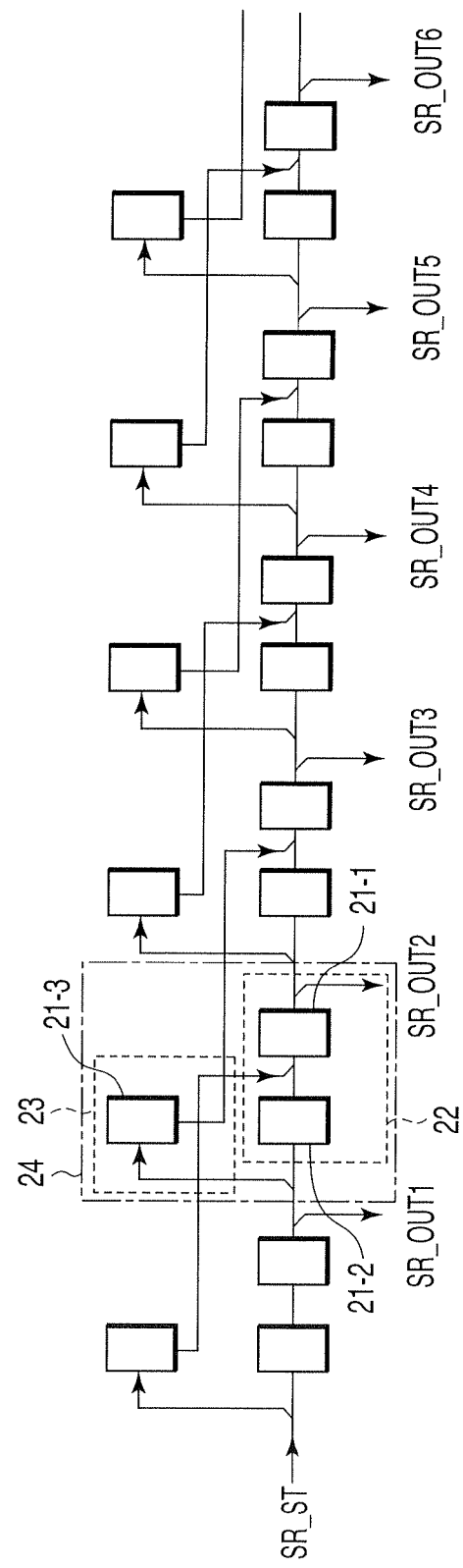
F I G. 2

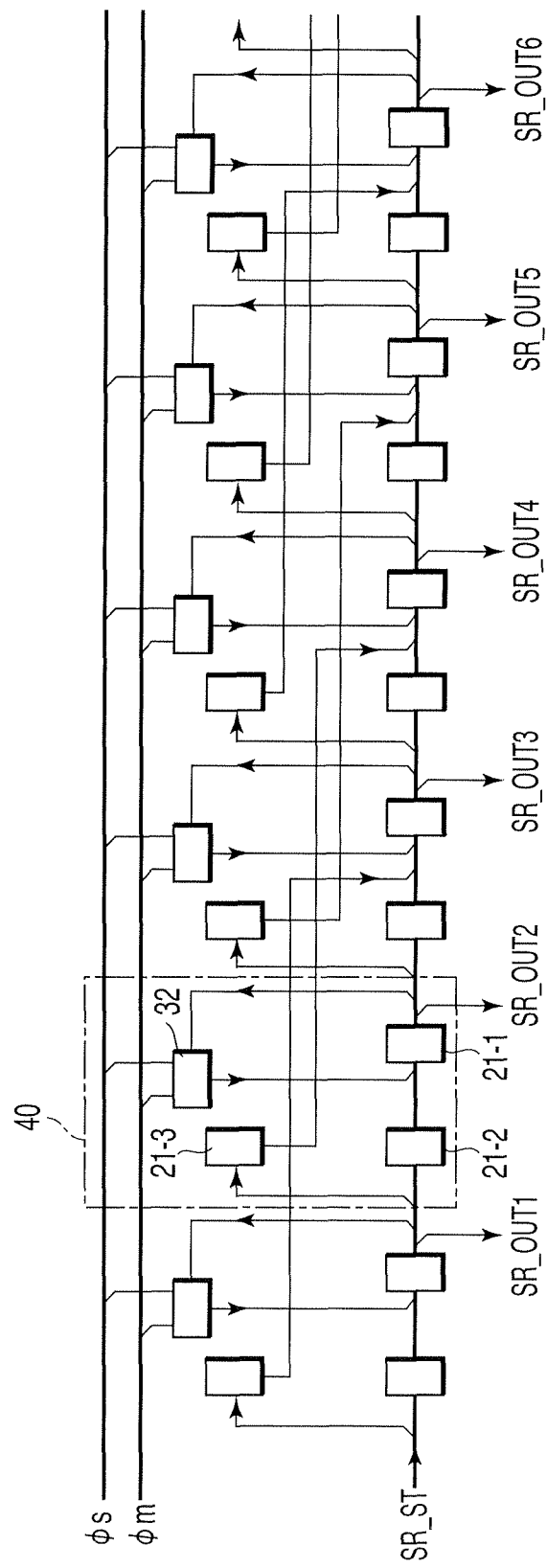
F I G. 15

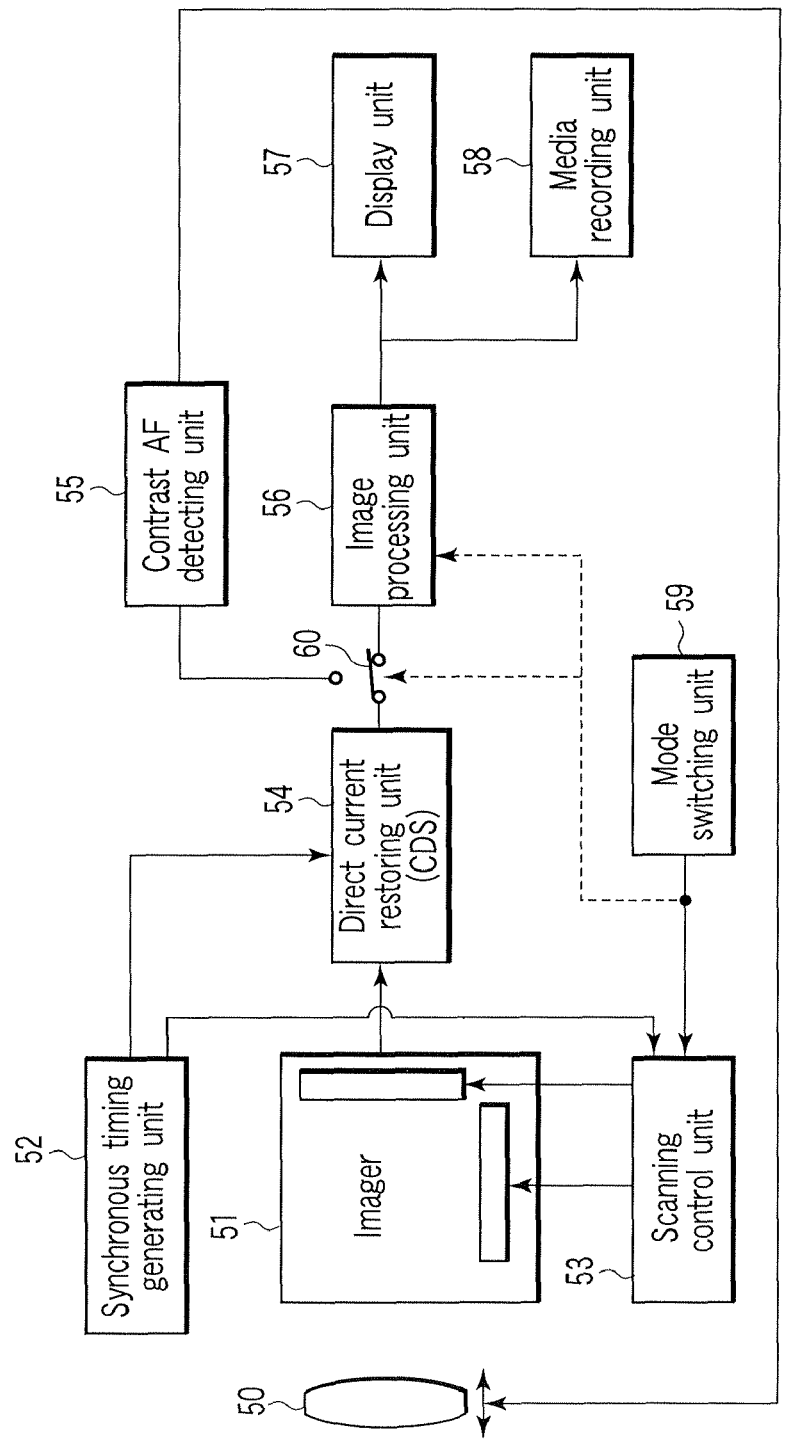
F I G. 16

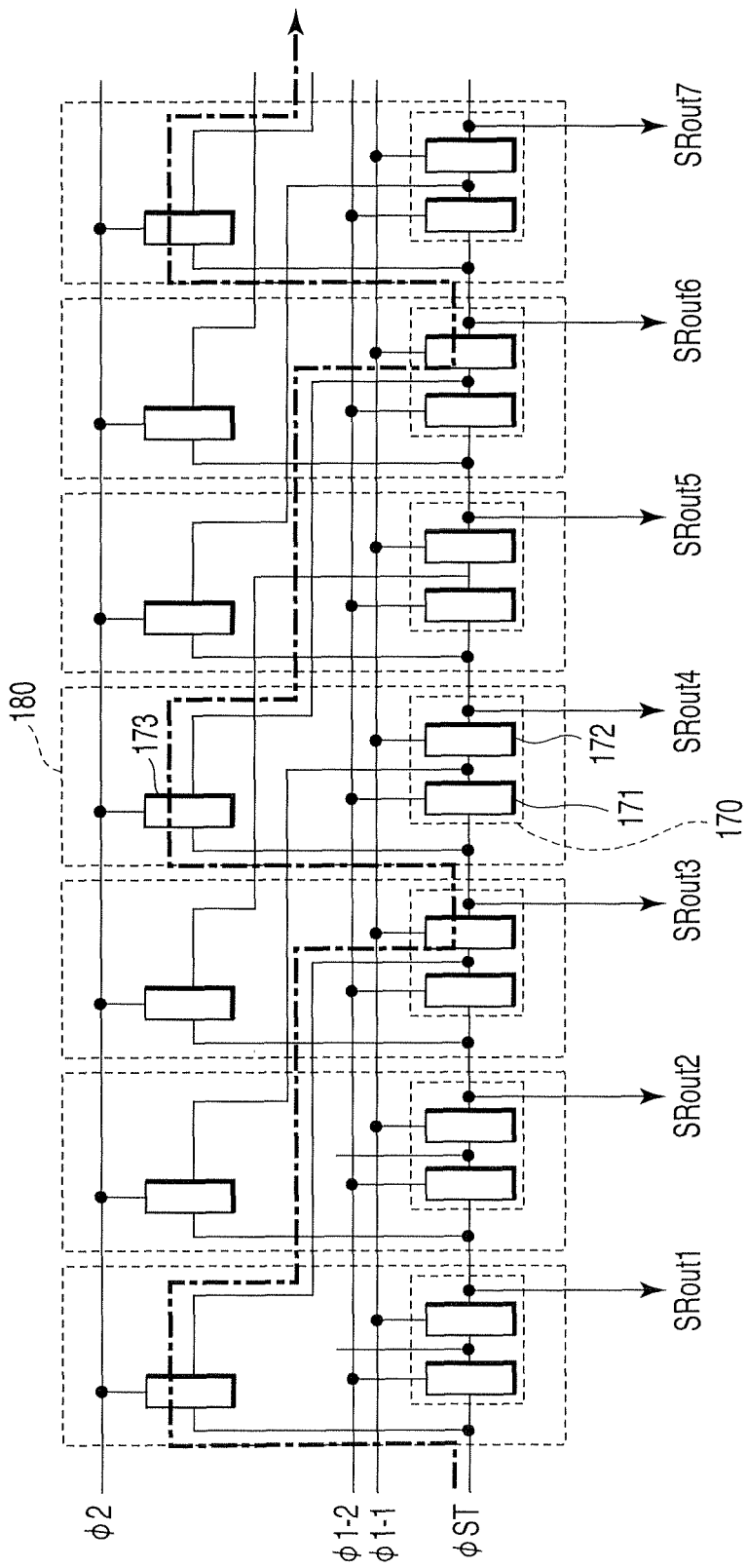
F I G. 25

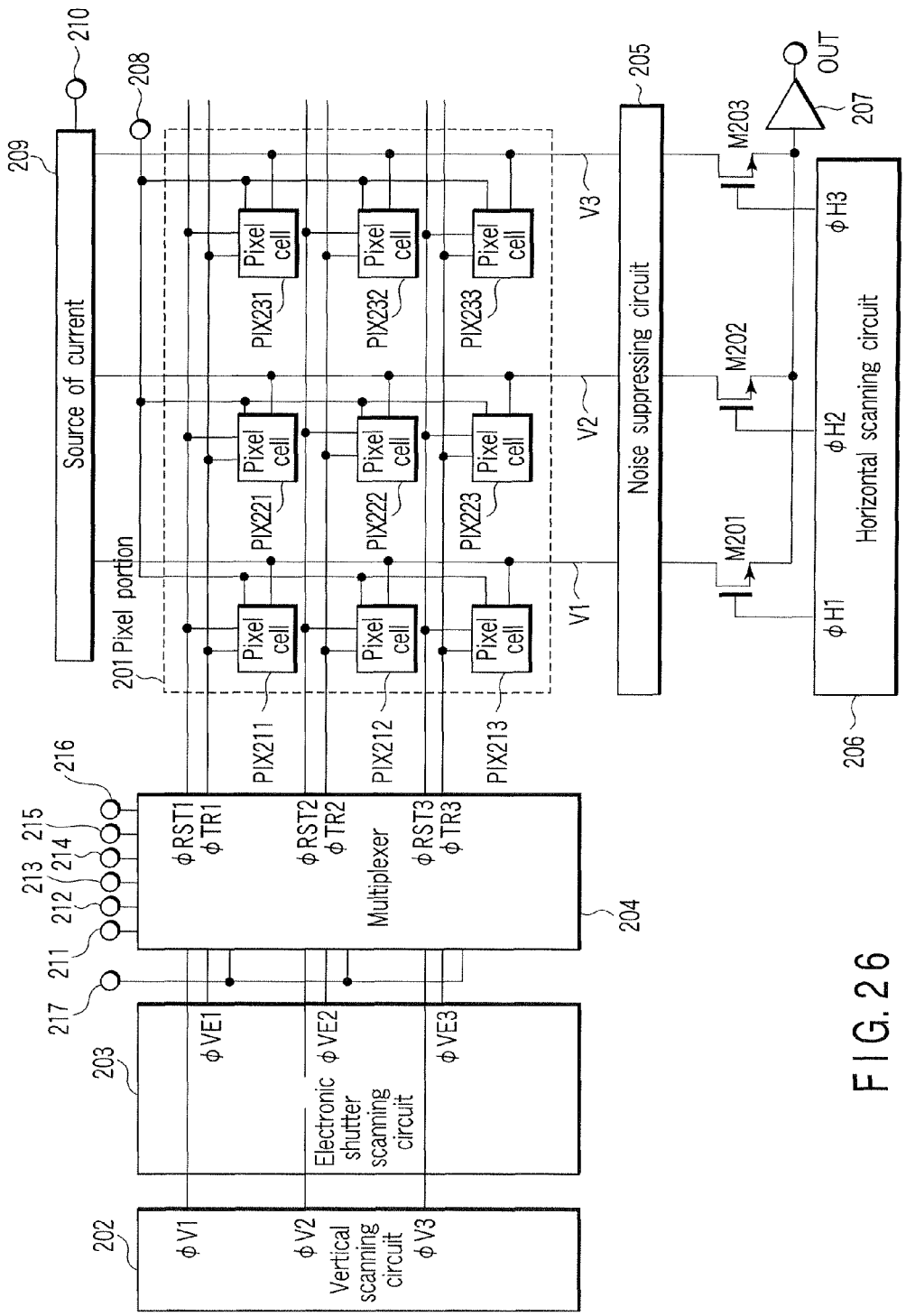
F I G. 26

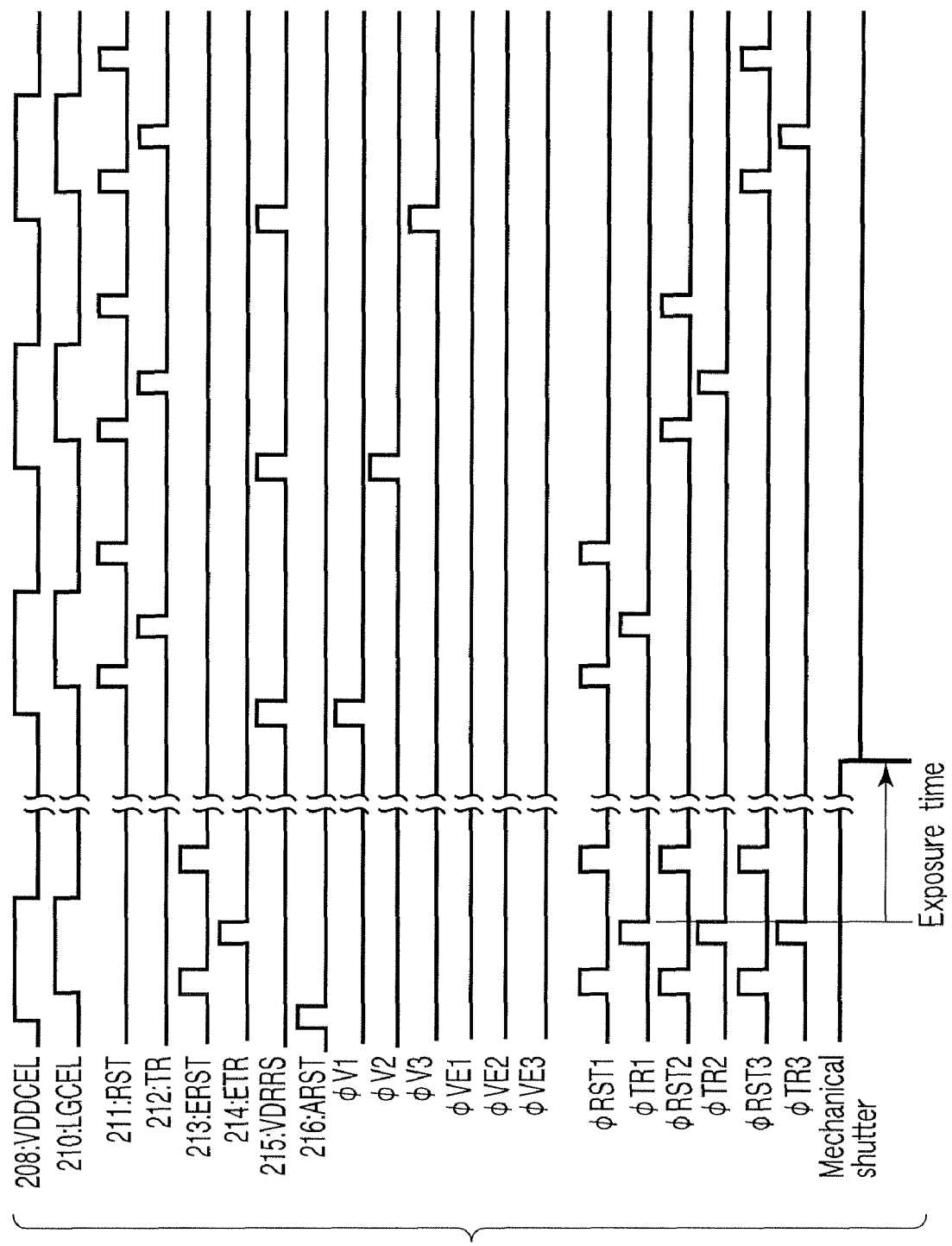
F I G. 31

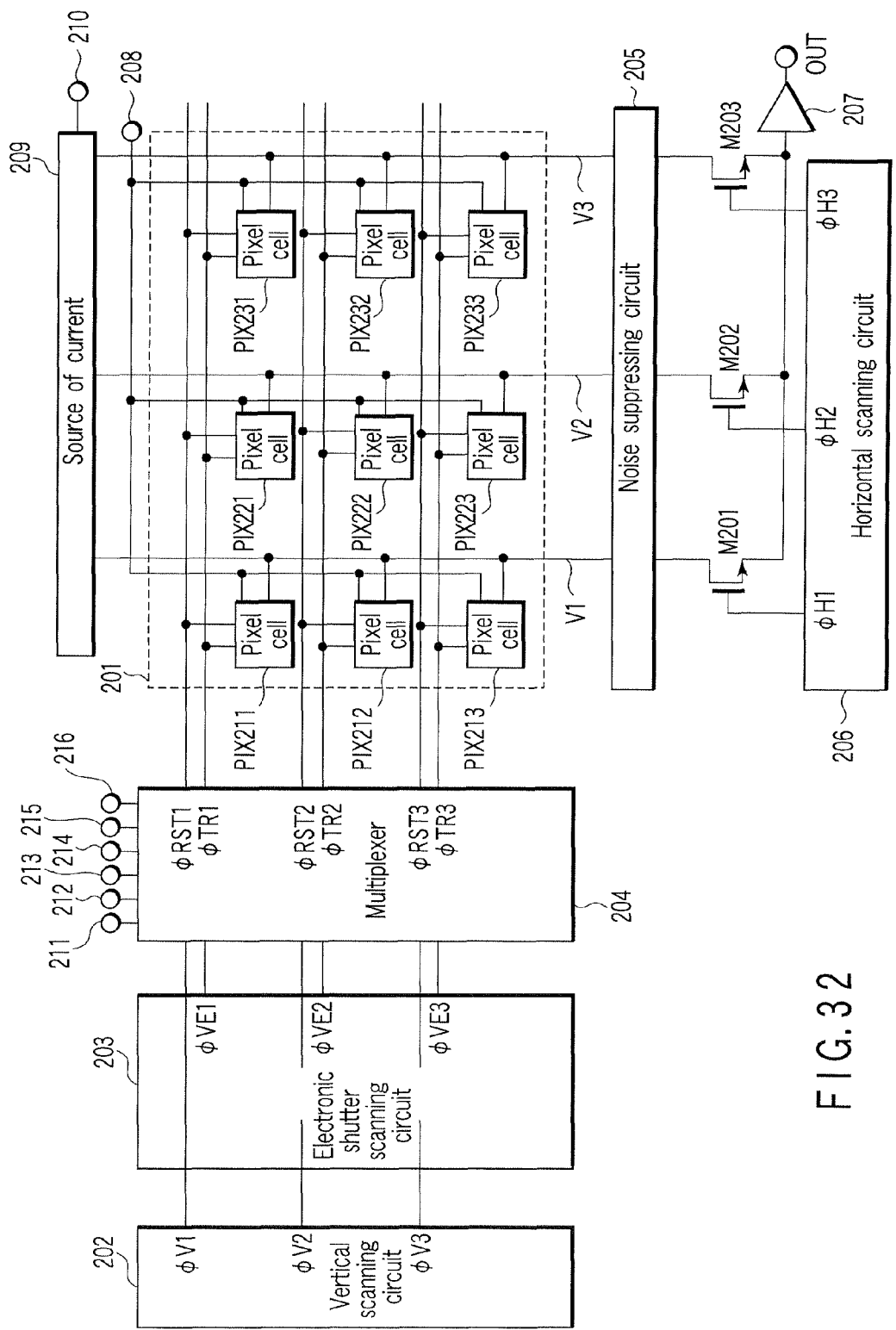
F I G. 32

SOLID-STATE IMAGER APPARATUS WHICH CARRIES OUT BOTH PROGRESSIVE SCANNING AND INTERLACE SCANNING IN ONE FRAME BY AN ARBITRARY COMBINATION, AND A CAMERA USING THE SOLID-STATE IMAGER APPARATUS

CROSS-REFERENCE TO RELATED APPLICATIONS

This application is a divisional application of U.S. patent application Ser. No. 10/910,779 (the entire contents of which are incorporated herein by reference), titled "IMAGE APPARATUS, DRIVING METHOD, AND CAMERA," filed on Aug. 3, 2004, now U.S. Pat. No. 7,528,873 listing Yuichi GOMI, Taishin YOSHIDA, Seisuke MATSUDA, Yukihiro KURODA and Keiichi MORI as the inventors, which claims the benefit of priority from prior Japanese Patent Application Nos. 2003-285786, filed Aug. 4, 2003; No. 2003-286775, filed Aug. 5, 2003; and No. 2003-206850, filed Aug. 8, 2003. The entire contents of the U.S. patent application and the three Japanese patent applications are incorporated herein by reference

BACKGROUND OF THE INVENTION

1. Field of the Invention

The present invention relates to a solid-state imager apparatus having an imager in which a plurality of pixel cells are arranged in a matrix form, and a driving method therefor, and further, to a camera using the solid-state imager apparatus.

2. Description of the Related Art

First, a technique relating to a first aspect of the present invention will be described. Conventionally, various techniques with respect to a shift register which can be made to scan in predetermined units from an arbitrary position, and a solid-state imager apparatus using the shift register are disclosed. For example, in Jpn. Pat. Appln. KOKAI Publication No. 9-163245, as a solid-state imager apparatus capable of realizing interlace scanning, there is disclosed a solid-state imager apparatus having a shift register configured such that a plurality of unit stages respectively having a plurality of shift register units are connected in series. Moreover, in Jpn. Pat. Appln. KOKAI Publication No. 6-350933, as a shift register which can start to scan from an arbitrary position, there is disclosed a shift register in which storage units for storing outputs of the shift register units are provided to the shift register units which are unit stages.

Next, a technique relating to a second aspect of the present invention will be described. Conventionally, in the field of electronic camera or the like, from the standpoints of high-speed reading and low electric power consumption, only the pixels which are necessary and sufficient at the time of displaying an image before image being picked-up have been read out. As this type of technique, for example, in Jpn. Pat. Appln. KOKAI Publication No. 2000-004406, there is disclosed a technique relating to an electronic camera with the feature that row groups or column groups among a plurality of photoelectric conversion pixels arranged in a matrix form are selected by a scanning circuit, and due to a desired row or column being arbitrarily selected from among the selected row groups or column groups by a selection circuit, only the pixels of the desired row or column are precisely interlaced and read.

Next, a technique relating to a third aspect of the present invention will be described. Generally, a solid-state imager apparatus has a pixel portion in which a plurality of pixel cells respectively having a function of converting an incident light into an electrical signal are arranged in a matrix form. A configuration using a CCD (Charge Coupled Device) and a configuration using a MOS (Metal Oxide Semiconductor) are mainly used. The MOS type solid-state imager apparatus is suitable for realizing a small-sized image sensor because it is easy to load various circuits on a same chip. For example, in Jpn. Pat. Appln. KOKAI Publication No. 2002-354343 or No. 2003-46864, there is disclosed one example of a conventional MOS type image sensor.

BRIEF SUMMARY OF THE INVENTION

According to a first aspect of the present invention, there is provided an XY address type solid-state imager apparatus comprising a solid-state imager having a plurality of pixels two-dimensionally arranged and horizontal and vertical scanning circuits to read signals of the pixels, wherein the scanning circuits each have a progressive scanning circuit to progressively read out pixel signals by a first scanning control signal and an interlace scanning circuit to read pixel signals with an interlaced manner by a second scanning control signal different from the first scanning control signal, and arbitrarily carries out combining of progressive reading and interlace reading in one frame in accordance with a combination of the respective scanning control signals, and reads pixel signals.

Here, the scanning circuits each preferably have a scanning driving unit to start to scan from an arbitrary row or column and a scanning stop unit to stop scanning on an arbitrary row or column, and reads an arbitrary area in one frame.

Further, the scanning circuits each are preferably configured such that shift register circuits which are unit stages are connected in multiple stages, and each shift register circuit further has a plurality of information transmitting units which transmit information by separate clocks.

Furthermore, the scanning circuits each are preferably configured such that shift register circuits which are unit stages are connected in multiple stages, and each shift register circuit further has a plurality of information transmitting units which transmit information by separate clocks and a storage unit which stores an output of each shift register circuit.

Moreover, the information transmitting units preferably include clock type inverters.

According to a second aspect of the present invention, there is provided a camera comprising: a solid-state imager having a plurality of pixels two-dimensionally arranged; horizontal and vertical scanning circuits which have a progressive scanning circuit to progressively read pixel signals by a first scanning control signal, and an interlace scanning circuit to read pixel signals with an interlaced manner by a second scanning control signal different from the first scanning control signal; a scanning control unit which outputs the first scanning control signal and the second scanning control signal; and a mode switching unit which switches to a predetermined mode, wherein the camera arbitrarily carries out combining of progressive reading and interlace reading in one frame in accordance with a combination of the first and second scanning control signals on the basis of a setting of the mode switching unit, and reads pixel signals.

Here, the scanning circuits each preferably have a scanning driving unit to start to scan from an arbitrary row or column, and a scanning stop unit to stop scanning on an arbitrary row or column, the scanning circuits reading an arbitrary area in one frame.

According to a third aspect of the present invention, there is provided a solid-state imager apparatus comprising a solid-state imager having color filters in a predetermined arrangement, the solid-state imager apparatus having a mode in which all pixels are progressively outputted, and a mode in which interlace reading for pixels is carried out in one frame and pixel signals of pixels which are at a same color phase among color phase coding regulated by the color filters are averaged with respect to the pixels and outputted.

According to a fourth aspect of the present invention, there is provided an XY address type solid-state imager apparatus comprising a solid-state imager in which a plurality of pixels having color filters in which at least some of those are Bayer-patterned are two-dimensionally arranged, and horizontal and vertical scanning circuits to read the pixels, the solid-state imager apparatus comprising: a signal averaging switch unit which averages pixel signals of pixels which are at a same color phase among color phase coding regulated by the color filters; and a mode in which all pixels are progressively outputted on the basis of controls of the scanning circuits, and a mode in which interlace reading for pixels is carried out in one frame, and signals which have been averaged by the signal averaging switch unit with respect to the pixels are outputted.

Here, pixels of a part of the solid-state imager are preferably shading pixels, and the signal averaging switch unit further averages signals of predetermined pixels among signals relating to the shading pixels. Preferably, reading is progressively carried out in one frame with respect to the shading pixels.

Further, the signal averaging switch unit comprises a shading pixel signal averaging switch unit and an effective pixel signal averaging switch unit, and controls whether or not it is possible to average the signals relating to the shading pixels due to the shading pixel signal averaging switch unit by a first signal, and controls whether or not it is possible to average the pixel signals of the pixels which are at a same color phase among color phase coding regulated by the color filters due to the effective pixel signal averaging switch unit by a second signal.

The averaging is preferably carried out only in a horizontal direction, and is not carried out in a vertical direction.

In addition, preferably, switching of the mode in which all pixels are progressively outputted and the mode in which pixels are averaged and outputted is carried out by driving and controlling the horizontal and vertical scanning circuits and the signal averaging switch unit.

According to a fifth aspect of the present invention, there is provided a solid-state imager apparatus comprising: a pixel portion in which a plurality of pixel cells respectively having functions of converting an incident light into an electrical signal are arranged in a matrix; a row unit reset unit which can reset the pixel cells of the pixel portion in units of rows; and a simultaneous reset unit which can reset all of the pixel cells of the pixel portion simultaneously, wherein the solid-state imager apparatus executes a reset action in units of rows at the row unit reset unit and a simultaneous reset action at the simultaneous reset unit while switching those.

Here, preferably, the solid-state imager apparatus further comprises a vertical scanning circuit to scan rows to be read of the pixel portion, an electronic shutter scanning circuit to determine a timing of an exposure operation when a light is made to be incident to each pixel cell, and a multiplexer to output one of an output of the vertical scanning circuit and an output of the electronic shutter scanning circuit to the pixel portion, wherein the simultaneous reset unit is configured by a part of the multiplexer.

Further, the multiplexer is configured by: a reading output circuit comprising a transistor to fetch outputs of the vertical scanning circuit, a capacitance to accumulate reading row selection signals, and a reading output transistor; an electronic shutter output circuit comprising a transistor to fetch outputs of the electronic shutter scanning circuit, a capacitance to accumulate electronic shutter row selection signals, and an electronic shutter output transistor; and a simultaneous reset signal fetching transistor in which a source is connected to a connection between the transistor to fetch outputs of the electronic shutter scanning circuit and the capacitance to accumulate the electronic shutter row selection signals, and which has a gate to which a simultaneous reset pulse is inputted, and a drain connected to a simultaneous reset power supply, and an output line of the reading output circuit and an output line of the electronic shutter output circuit are in common.

Furthermore, the transistor configuring the respective pixel cells and the transistor configuring the multiplexer are preferably configured by the same conductive type MOS transistor.

Moreover, the multiplexer is preferably configured by: a reading output circuit comprising a transistor to fetch outputs of the vertical scanning circuit, a capacitance to accumulate reading row selection signals, and a reading output transistor; an electronic shutter output circuit comprising a transistor to fetch outputs of the electronic shutter scanning circuit, a capacitance to accumulate electronic shutter row selection signals, and an electronic shutter output transistor; and a simultaneous reset signal fetching transistor in which a source is connected to a connection between the transistor to fetch outputs of the electronic shutter scanning circuit and the capacitance to accumulate the electronic shutter row selection signals, and which has a gate and a drain to which a simultaneous reset pulse is inputted, and an output line of the reading output circuit and an output line of the electronic shutter output circuit are in common.

In addition, preferably, in an image acquiring operation by the simultaneous reset, an exposure starting timing is determined by the simultaneous reset action, and an exposure terminating timing is determined by an operation of closing a mechanical shutter.

According to a sixth aspect of the present invention, there is provided a method for driving a solid-state imager apparatus comprising a pixel portion in which a plurality of pixel cells respectively having functions of converting an incident light into an electrical signal are arranged in a matrix, the method comprising: carrying out a row unit reset action in which the pixel cells of the pixel portion are reset in units of rows and a simultaneous reset action in which all of the pixel cells of the pixel portion are reset simultaneously while switching those.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a diagram showing a configuration example of shift registers 4 and 8 configuring a part of the solid-state imager apparatus shown in FIG. 1 which is further implemented.

FIG. 15 is a diagram showing a configuration example of the shift register that realizes the reading method as shown in FIG. 12 in the second concrete example of the first embodiment of the invention.

FIG. 16 is a diagram showing a configuration of a camera to which the solid-state imager apparatus according to the first concrete example and second concrete example described above is applied as a third concrete example of the first embodiment of the invention.

FIG. 25 is a conceptual diagram for explanation of ⅓ skip scanning in accordance with the configuration of FIG. 23.

FIG. 26 is a diagram showing a configuration of a MOS type solid-state imager apparatus according to a third embodiment of the present invention.

FIG. 31 is a timing chart for explanation of a driving timing according to the third embodiment in which a simultaneous reset is used.

FIG. 32 is a diagram showing a configuration of a MOS type solid-state imager apparatus according to a modified example of the third embodiment of the invention.

DETAILED DESCRIPTION OF THE INVENTION

First Embodiment

First, an outline of a solid-state imager apparatus comprising a shift register which is configured such that a plurality of unit stages respectively having a plurality of shift register units are connected in series and which achieves progressive scanning and interlace scanning will be described with reference to FIGS. 1 and 2.

Figure 1:
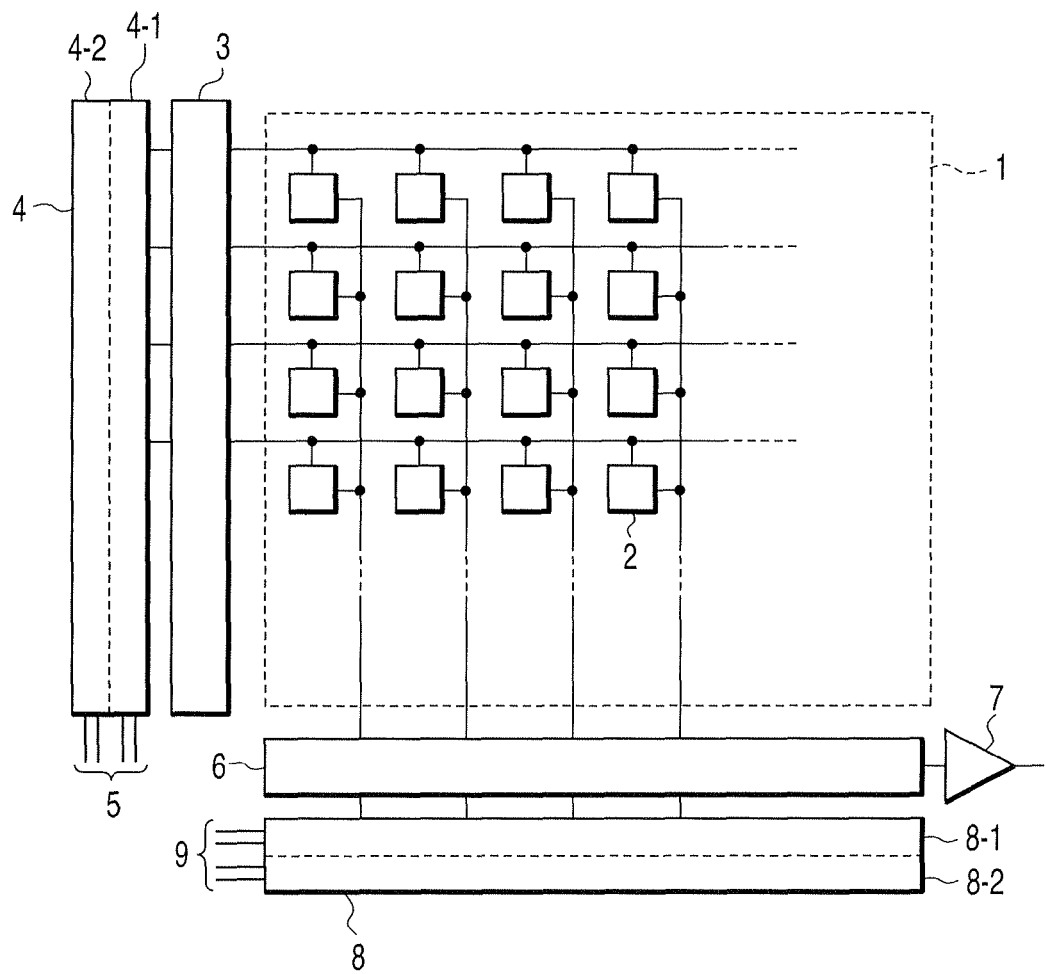
FIG. 1 is a diagram showing a schematic configuration of a solid-state imager apparatus according to a first embodiment of the present invention.

A schematic configuration of a solid-state imager apparatus which is to be the base of a first embodiment of the present invention is shown in FIG. 1, and will be described. As shown in FIG. 1, a pixel matrix 1 is configured due to a plurality of pixels 2 being arranged in a two-dimensional form. A vertical shift register 4 to be driven on the basis of a vertical shift register control signal 5 is configured by a progressive scanning shift register unit 4-1 and an interlace scanning shift register unit 4-2. The vertical shift register 4 is connected to a vertical selection circuit 3.

On the other hand, a horizontal shift register 8 to be driven on the basis of a horizontal shift register control signal is configured by a progressive scanning shift register unit 8-1 and an interlace scanning shift register unit 8-2. The horizontal shift register 8 is connected to a horizontal selection circuit 6. In addition the above description, reference numeral 7 denotes an amplifier for outputting the pixel signals.

Next, a configuration example of the shift registers 4 and 8 configuring a part of the solid-state imager apparatus shown in FIG. 1 is shown so as to be further implemented in FIG. 2, and will be described.

As shown in FIG. 2, the shift registers 4 and 8 are configured such that a plurality of shift register circuits 24 serving as unit stages are connected in series.

Then, the shift register circuit 24 serving as a unit stage is configured such that information transmitting units 21-1, 21-2, and 21-3 for transmitting information respectively by driving clocks $\phi1$, $\phi2$, and $\phi3$ are connected as shown in the drawing. As the information transmitting units 21-1, 21-2, and 21-3, for example, clock type inverters or the like are used.

In the shift register circuit 24 serving as a unit stage, a first shift register unit 22 is configured due to the information transmitting units 21-1 and 21-2 being subordinately connected, and a second shift register unit 23 which is connected so as to have the inputs in common with the first shift register unit 22 and to output to the first shift register unit at one or more following unit stages is configured.

Hereinafter, with reference to the timing charts of FIGS. 3 and 4, driving methods for the shift registers 4 and 8 configured as in FIG. 2 will be described in detail.

Note that, in the following description, when an attempt is made to distinguish which unit stage of a shift register circuit each information transmitting unit and shift register unit correspond to, reference numerals in parentheses will be used.

For example, in a case of the first unit stage, it will be described so as to be the shift register circuit 24(1), the information transmitting units 21-1(1), 21-2(1), and 21-3(1), the first shift register unit 22(1), and the second shift register unit 23(1).

First, progressive scanning will be described with reference to the timing chart of FIG. 3.

Figure 3:
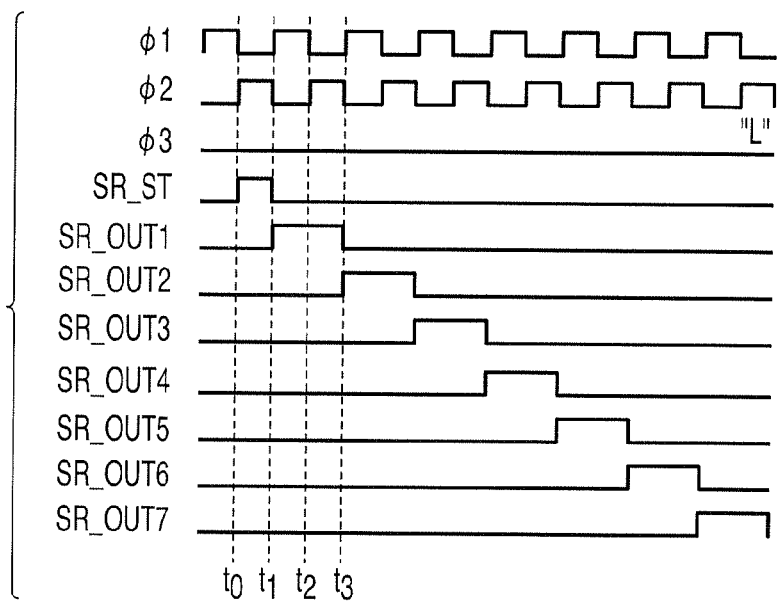
FIG. 3 is a timing chart for explanation in detail of a driving method (progressive scanning) for the shift registers 4 and 8 configured as in FIG. 2.

In FIG. 3, when an input pulse SR_ST is applied to the first shift register circuit 24(1) at a time $t_0$, at the same time thereof, the signal is transmitted to the information transmitting unit 21-1(1) by the information transmitting unit 21-2(1) configuring the first shift register unit 22(1) of the first shift register circuit 24(1) when a clock $\phi2$ is at an "H" level.

At the following time $t_1$, at the same time when the signal is transmitted to the shift register circuit 24(2) at the next unit stage by the information transmitting unit 21-1(1) when a clock $\phi1$ is at the "H" level, an output SR_OUT1 of the shift register circuit 24(1) of the first stage is made to be at the "H" level.

Hereinafter, in the same way, signals are successively transmitted in timings when the clock $\phi2$ and the clock $\phi1$ are made to be at the "H" level, and the signals are transmitted to the outputs of the shift registers 4 and 8.

In such operations, a clock $\phi3$ is maintained to be at an "L" level, and the second shift register unit 23 does not operate. The driving methods for the shift registers 4 and 8 described above are applied to the solid-state imager apparatus, whereby pixel signals can be progressively read.

Next, interlace scanning will be described with reference to the timing chart of FIG. 4.

Figure 4:
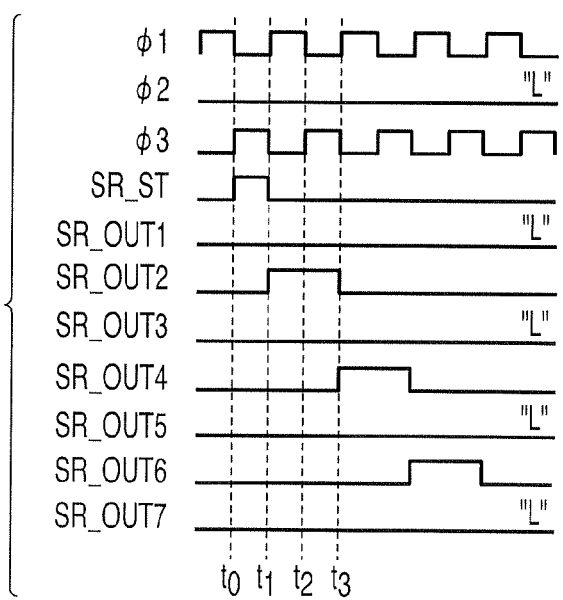
FIG. 4 is a timing chart for explanation in detail of a driving method (interlace scanning) for the shift registers 4 and 8 configured as in FIG. 2.

In FIG. 4, when an input pulse SR_ST is applied to the first shift register circuit 24(1) at the time $t_0$, at the same time thereof, the signal is transmitted to the information transmitting unit 21-2(2) configuring the first shift register unit 22(2) of the shift register circuit 24(2) of the next unit stage by the information transmitting unit 21-3(1) configuring the second shift register unit 23(1) of the first shift register circuit 24(1) when the clock $\phi3$ is at the "H" level.

At the following time $t_1$, at the same time when the signal is transmitted to the shift register circuit 24(3) of the third unit stage by the information transmitting unit 21-1(2) when the clock $\phi1$ is at the "H" level, an output SR_OUT2 of the shift register circuit 24(2) is made to be at the "H" level.

Then, at a time $t_2$, when the clock $\phi3$ is at the "H" level, the signal is transmitted to the first shift register unit 22(4) of the shift register circuit 24(4) of the fourth unit stage by the second shift register unit 23(3) at the third stage.

Moreover, at a time $t_3$, when the clock $\phi1$ is at the "H" level, at the same time when the signal is transmitted to the shift register circuit 24(5) of the fifth unit stage by the information transmitting unit 21-1(4), an output SR_OUT4 of the shift register circuit 24(4) is made to be at the "H" level.

Hereinafter, in the same way, signals are transmitted in timings when the clock $\phi3$ and the clock $\phi1$ are made to be at the "H" level, and the signals are transmitted every other stage to the outputs of the shift registers 4 and 8.

In such operations, the clock $\phi2$ is maintained to be at the "L" level, and the information transmitting unit 21-2(1) in the first shift register unit 22 does not operate.

The driving methods of the shift registers 4 and 8 described above are applied to the solid-state imager apparatus, whereby pixel signals can be read out with an interlaced manner. Note that it is recommended that intervals at which the pixels are interlaced be changed by changing the output address of the second shift register unit 23.

Next, another configuration example of the shift registers 4 and 8 configuring a part of the solid-state imager apparatus shown in FIG. 1 is further implemented in FIG. 5, and will be described.

Figure 5:
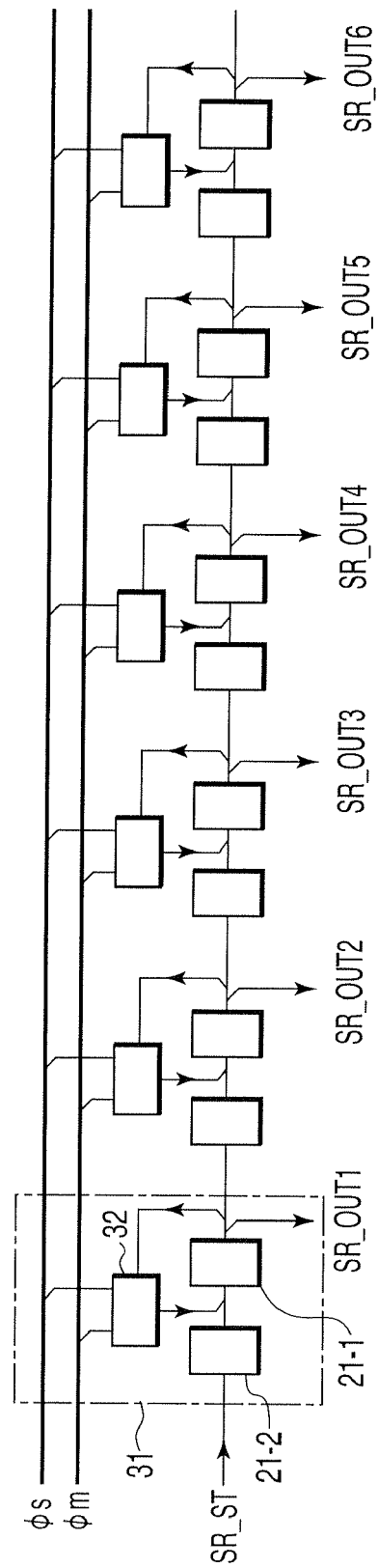
FIG. 5 is a diagram showing another configuration example of the shift registers 4 and 8 configuring a part of the solid-state imager apparatus shown in FIG. 1 which is further implemented.

As shown in FIG. 5, the shift registers 4 and 8 further comprise a storage unit 32 for storing outputs of a shift register circuit 31 at the shift register circuit 31 which is a unit stage, and can start to scan from an arbitrary position. In more detail, the shift register is configured such that a plurality of shift register circuits 31 which are unit stages are connected in series.

Reference numerals 21-1 and 21-2 are respectively information transmitting units for transmitting information by the driving clocks $\phi1$ and $\phi2$, and clock type inverters or the like can be used. Reference numeral 32 is a storage unit for storing the outputs of the shift register circuit 31, and has a function of storing information by a control signal $\phi m$, and of reading information by a control signal $\phi s$.

Hereinafter, with reference to the timing chart of FIG. 6, the driving methods for the shift registers 4 and 8 configured as in FIG. 5 will be described in detail.

Note that, in the following description, when an attempt is made to distinguish which unit stage of a shift register circuit each information transmitting unit, shift register unit and the like correspond to, reference numerals in parentheses will be used.

For example, in a case of the first unit stage, it will be described so as to be the shift register circuit 31(1), the storage unit (1), the information transmitting units 21-1(1), 21-2(1), and 21-3(1), the first shift register unit 22(1), and the second shift register unit 23(1).

First, when an input pulse SR_ST is applied to the shift register circuit 31(1) at the time $t_0$, at the same time thereof, the signal is transmitted to the information transmitting unit 21-1(1) by the information transmitting unit 21-2(1) when the clock $\phi2$ is at the "H" level.

At the time $t_1$, at the same time when the signal is transmitted to the shift register circuit 31(2) of the next unit stage by the information transmitting unit 21-1 (1) when the clock φ1 is at the "H" level, the output SR_OUT1 of the shift register circuit 31(1) is made to be at the "H" level.

Hereinafter, in the same way, signals are transmitted in timings when the clock φ2 and the clock φ1 are made to be at the "H" level, and the signals are transmitted to the outputs of the shift register.

At the time $t_2$, when the φm is made to be at the "H" level, the output signal SR_OUT4 of the shift register circuit 31(4) is stored in the storage unit 32(4).

Next, at the time $t_3$, when the φs is made to be at the "H" level, the maintained information is read out of the storage unit 32(4), and the signals are transmitted to the information transmitting unit 21-1(4).

Subsequently, at a following time $t_4$, when the clock φ1 is at the "H" level, at the same time when the signal is transmitted to the shift register circuit 31(5) of the fifth unit stage by the information transmitting unit 21-1(4), the output SR_OUT 4 of the shift register circuit is made to be at the "H" level.

Hereinafter, the shift registering operation is repeated in the timings when the clock φ2 and the clock φ1 are made to be at the "H" level. Note that, in FIGS. 5 and 6, the configuration and the timing for stopping the shift registering operation are not specified. However, the shift registering can be stopped at an arbitrary position by using a shift register with the so-called reset function which has been well known.

Accordingly, the shift registers 4 and 8 shown in FIG. 5 are applied to the solid-state imager apparatus as shown in FIG. 1, whereby an arbitrary pixel area can be read.

However, in the best mode of the present invention, by using the above-described technique as the base, reading of an area is carried out while interlace the pixels by operating the vertical shift register control signals 5 and the horizontal shift register control signals 9, whereby a frame rate can be switched while maintaining to fix a reading region, and moreover, it is possible to read the area at a high-speed.

Namely, the solid-state imager apparatus according to the best mode of the present invention is an XY address type solid-state imager apparatus which comprises the pixel matrix 1 having the plurality of pixels 2 two-dimensionally arranged, and the horizontal shift registers 8 and the vertical shift registers 4 for reading the signals of the pixels 2. The solid-state imager apparatus has the feature that the respective register 4 and 8 have progressive scanning shift register units 4-1 and 8-1 for progressively reading pixel signals and interlace scanning shift register units 4-2 and 8-2 for reading pixel signals with an interlaced manner, and the combination of progressive scanning and interlace scanning is arbitrarily carried out by a combination of these shift register units, and the pixel signals are read out. Moreover, the respective shift registers 4 and 8 are characterized by starting to scan from an arbitrary row or column, or stopping scanning on an arbitrary row or column, and reading an arbitrary area in one frame.

The respective shift registers 4 and 8 are configured such that the shift register circuits 24 which are unit stages are connected so as to be in plural stages, and each shift register circuit 24 further has a plurality of information transmitting units 21-1, 21-2, and 21-3 for transmitting information by different clocks. Or, the respective shift registers 4 and 8 are configured such that the shift register circuits 31 which are unit stages are connected so as to be in plural stages, and each shift register circuit 31 further has a plurality of information transmitting units 21-1 and 21-2 for transmitting information by different clocks, and the storage unit 32 for storing the outputs of the respective shift register circuits 31. The information transmitting units 21-1, 21-2, and 21-3 may be configured of clock type inverters or the like.

Further, as a camera, the camera has the pixel matrix 1 having the plurality of pixels 2 two-dimensionally arranged, the horizontal and vertical shift registers 4 and 8 which have the progressive scanning shift register units 4-1 and 8-1 for progressively reading pixel signals and the interlace scanning shift register units 4-2 and 8-2 for reading pixel signals with an interlaced manner by the vertical shift register control signals 5 and the horizontal shift register control signals 9, a scanning control unit for outputting the vertical shift register control signals 5 and the horizontal shift register control signal 9, and a mode switching unit for switching to a predetermined mode. The camera has the feature that a combination of progressive scanning and interlace scanning is arbitrarily carried out in one frame by a combination of the above-described scanning control signals, and the pixel signals are read out. The respective shift registers 4 and 8 have a configuration in which scanning is started from an arbitrary row or column, and the scanning is stopped on an arbitrary row or column, and can read an arbitrary area in one frame.

Figure 7:
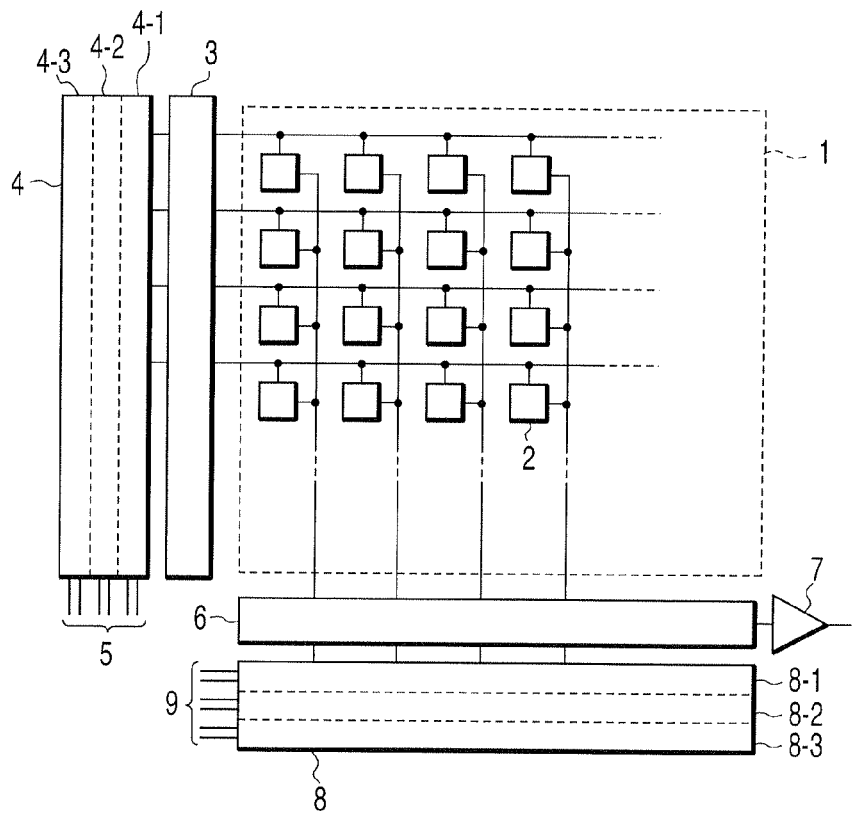
FIG. 7 is a diagram showing a schematic configuration of a solid-state imager apparatus according to a first concrete example of the first embodiment of the invention.

Hereinafter, some concrete examples according to the first embodiment of the invention will be described. In FIG. 7, a schematic configuration of the solid-state imager apparatus according to a first concrete example of the present invention is shown. As shown in FIG. 7, the pixel matrix 1 is configured such that the plurality of pixels 2 are two-dimensionally arranged. The horizontal shift registers 4 to be driven on the basis of the vertical shift register control signals 5 is configured of the progressive scanning shift register unit 4-1 for progressively carrying out shift registering operations, the interlace scanning shift register unit 4-2 for carrying out shift registering operations with predetermined intervals, and a storage unit 4-3 which stores the outputs of the shift registers and starts the shift registering operations from an arbitrary row. Then, the progressive scanning shift register unit 4-1, the interlace scanning shift register unit 4-2, and the storage unit 4-3 are operated by respectively separated control clocks or control pulses. In FIG. 7, these control clocks and control pulses are all together shown as the vertical shift register control signals 5. The vertical shift register 4 is connected to the vertical selection circuit 3.

Then, the horizontal shift registers 8 to be driven on the basis of the horizontal shift register control signals is configured of the progressive scanning shift register unit 8-1 for progressively carrying out shift registering operations, the interlace scanning shift register unit 8-2 for carrying out shift registering operations with predetermined intervals, and a storage unit 8-3 which stores the outputs of the shift registers and starts the shift registering operations from an arbitrary column. The progressive scanning shift register unit 8-1, the interlace scanning shift register unit 8-2, and the storage unit 8-3 are operated by respectively separated control clocks or control pulses. In FIG. 7, these control clocks and control pulses are all together shown as the horizontal shift register control signals 9. The horizontal shift register 8 is connected to the horizontal selection circuit 6 for selecting the pixel columns of the pixel matrix 1. In addition to the above description, reference numeral 7 denotes an amplifier outputting pixel signals.

Figure 6:
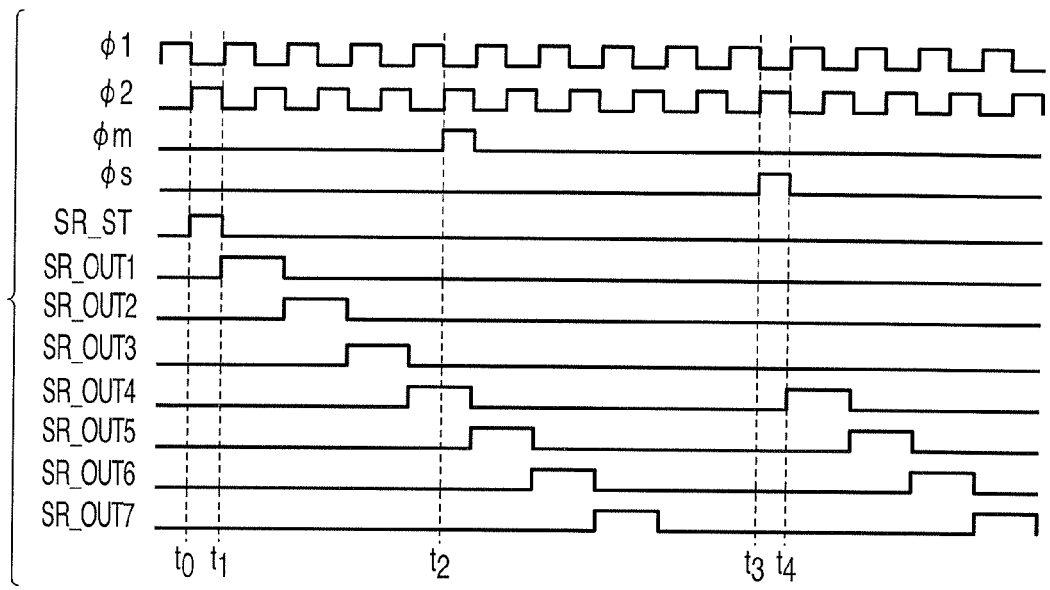
FIG. 6 is a timing chart for explanation in detail of a driving method for the shift registers 4 and 8 configured as in FIG. 5.

In such a configuration, the vertical shift register 4 and the horizontal shift register 8 appropriately control the vertical shift register control signals 5 and the horizontal shift register signals 9, whereby progressive scanning as shown above in FIG. 3 and interlace scanning as shown above in FIG. 4, and further, area selecting scanning as shown in FIG. 6 can be obtained.

Figure 8:
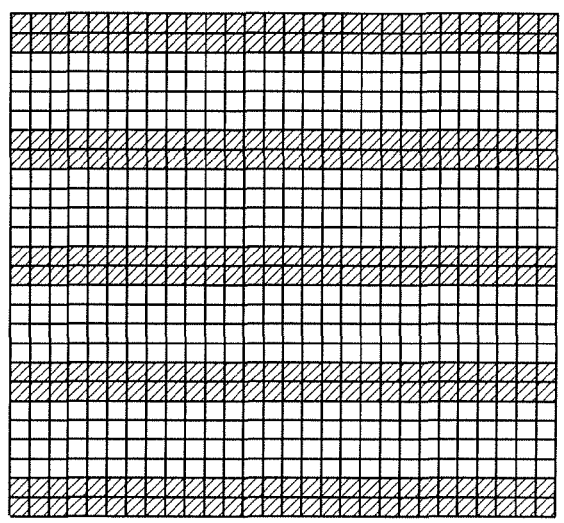
FIG. 8 is a conceptual illustration of a reading method of the solid-state imager apparatus according to the first concrete example of the first embodiment of the invention.

Here, a conceptual illustration of a reading method of the solid-state imager apparatus according to the first concrete example is shown in FIG. 8. FIG. 8 shows ranges of the pixel matrix in a case where progressive scanning and four pixel interlace scanning are repeatedly carried out in the vertical direction and progressive scanning is carried out in the horizontal direction. Then, in FIG. 8, the oblique line portions correspond to the ranges of the pixels to be read.

Hereinafter, a relationship between the vertical shift register control signals 5 which are input signals and output signals when the reading method as shown above in FIG. 8 is achieved by the vertical shift register 4 in the first concrete example is shown in the timing chart of FIG. 9, and will be described in detail.

Figure 10:
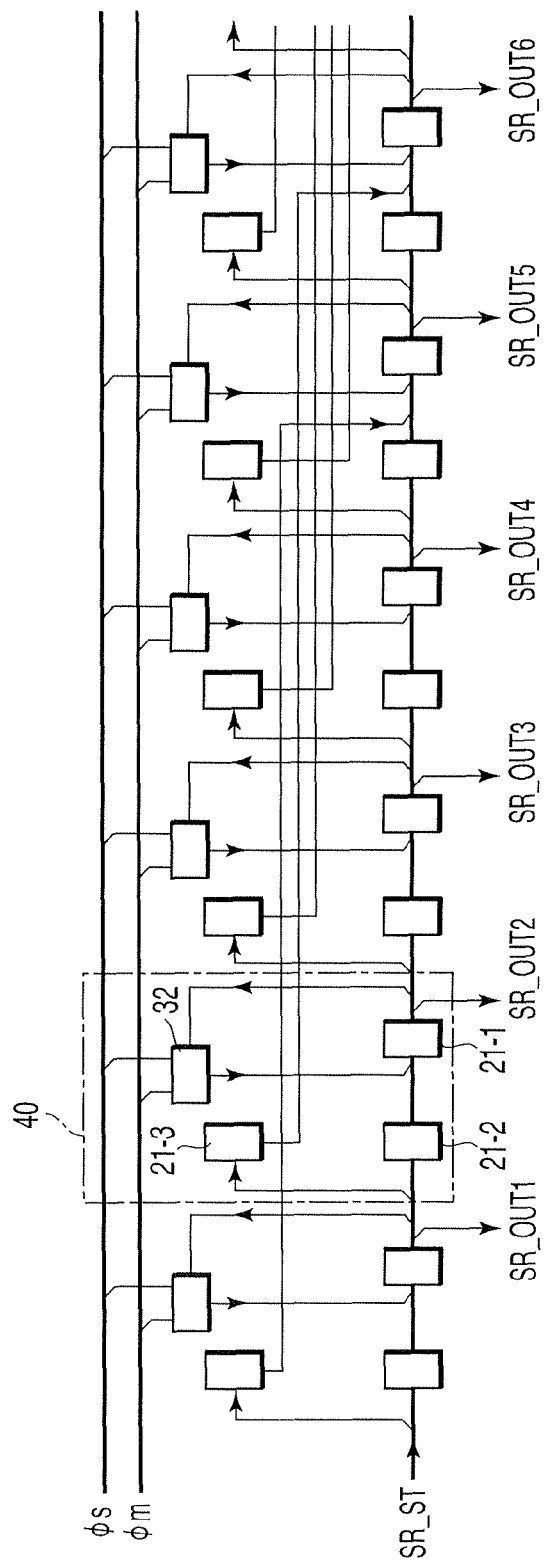
FIG. 10 is a diagram showing a configuration example of the shift register that realizes the reading method as shown in FIG. 8 in advance in the first concrete example of the first embodiment of the invention.

Here, the description will appropriately refer to FIG. 10. The respective configurations of FIG. 10 are duplicate with the above-described contents, and therefore, detailed descriptions thereof will be omitted. In the following description, when an attempt is made to distinguish which unit stage of a shift register circuit each information transmitting unit and shift register unit correspond to, reference numerals in parentheses will be used. For example, in a case of the first unit stage, it will be described so as to be the shift register circuit 40(1), the information transmitting units 21-1(1), 21-2(1), and 21-3(1), and the storage unit 32(1).

Figure 9:
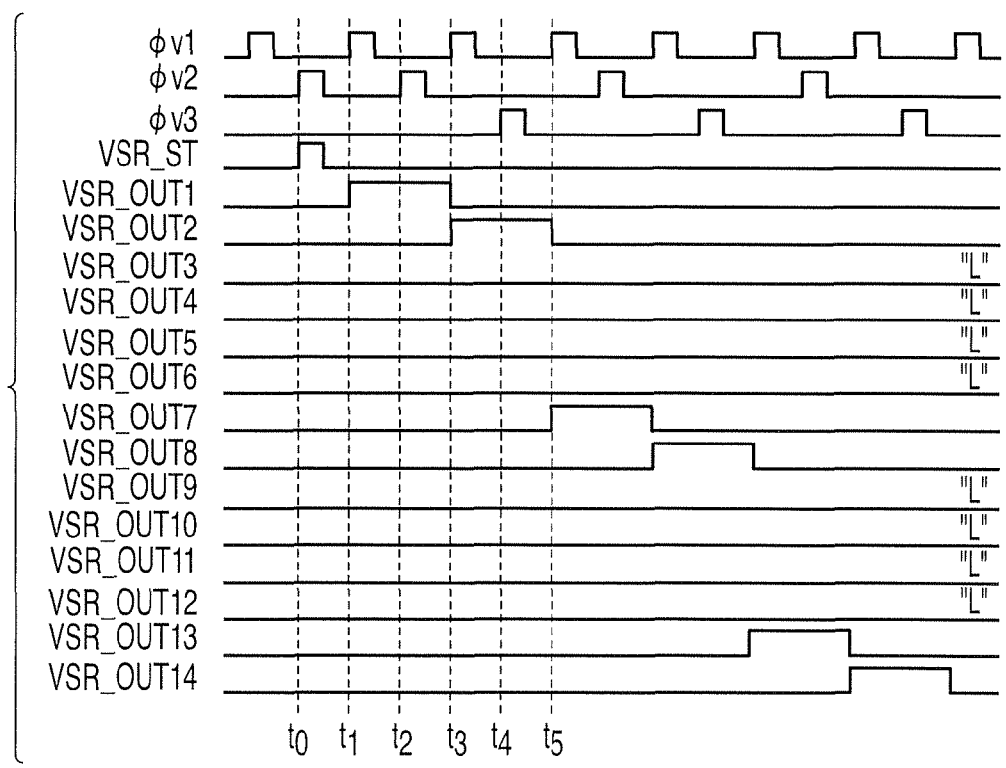
FIG. 9 is a timing chart showing details in a case where the reading method as shown in FIG. 8 in advance is realized by a vertical shift register 4 in the first concrete example of the first embodiment of the invention.

As shown in FIG. 9, at the vertical shift register 4, when a start pulse VSR_ST is applied thereto and shift registering operations are carried out, output signals are outputted in timings when the clock φv1 is made to be at the "H" level.

When progressive scanning is carried out, the signals are transmitted to the next stage by the progressive scanning shift register unit 4-1 in timings when the clock φv2 is made to be at the "H" level. On the other hand, when interlace scanning is carried out, the signals are transmitted to the stages which are plural stages later designated by the interlace scanning shift register unit 4-2 in timings when the clock φv3 is made to be at the "H" level.

First, at the time $t_0$, when a start pulse VSR_ST is applied, at the same time thereof, the signal is transmitted to the shift register circuit 40(1) of the first stage when the clock φv2 is at the "H" level. Next, at the time $t_1$, when the clock φv1 is made to be at the "H" level, the signal is outputted to an output VSR_OUT1 of the shift register circuit 40(1).

At the time $t_2$, when the clock φv2 is made to be at the "H" level, the signal is transmitted to the shift register circuit 40(2) at the second stage, and when the clock φv1 is at the "H" level at the time $t_3$, the signal is outputted to an output VSR_OUT2 of the shift register circuit 40(2).

Next, at the time $t_4$, when the clock φv3 is made to be at the "H" level, the signal is transmitted to the shift register circuit 40(7) at the seventh stage by an interlace scanning shift registering operation, and when the clock φv1 is made to be at the "H" level at a time $t_5$, the signal is outputted to an output VSR_OUT7 of the shift register circuit 40(7). Hereinafter, the cycle of the times $t_1$ to $t_5$ is repeated, and due to progressive scanning and four pixel interlace scanning being repeated, the reading method shown in FIG. 8 is achieved.

As described above, in the first concrete example, the method for reading a pixel matrix due to a combination of progressive scanning and four pixel interlace scanning of the vertical shift register 4 has been shown. However, repetition of progressive scanning and repetition of progressive scanning of interlace scanning can be arbitrarily carried out by a combination of the timings of the clock φv2 and the clock φv3. Further, as the number of interlace of the interlace scanning, a desired value can be obtained by changing the configuration of the respective interlace scanning shift register units 4-2.

Figure 11:
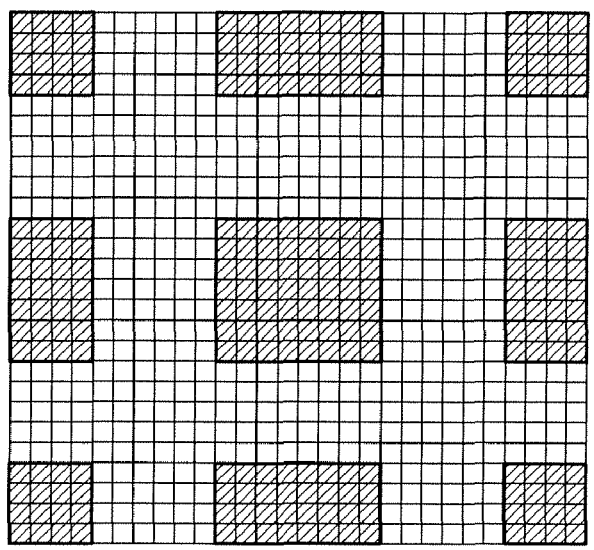
FIG. 11 is a diagram showing an example in which a plurality of pixel areas are read by carrying out combination of progressive scanning and interlace scanning in the horizontal direction and the vertical direction with respect to the first concrete example of the first embodiment of the invention.

Moreover, reading of the pixel matrix due to a combination of progressive scanning and interlace scanning is not limited to only the vertical direction, and can be applied to the reading in the horizontal direction and to reading due to a combination of the both. For example, a conceptual illustration of FIG. 11 shows an example in which a plurality of pixel areas are read out by carrying out scanning into which progressive scanning and interlace scanning are combined in the horizontal direction and the vertical direction. Namely, in FIG. 11, the oblique line portions correspond to the ranges of the pixels to be read.

In this way, in accordance with the solid-state imager apparatus according to the first concrete example, by operating the vertical shift register control signals 5 and the horizontal shift register control signals 9, a method for reading pixels can be switched in accordance with a purpose without the circuit configuration being changed.

Because a schematic configuration of a solid-state imager apparatus according to a second concrete example of the present invention is in common with that shown above in the first concrete example (FIG. 7), here, configurations which are the same as those of FIG. 7 are referred with the same reference numerals.

Figure 12:
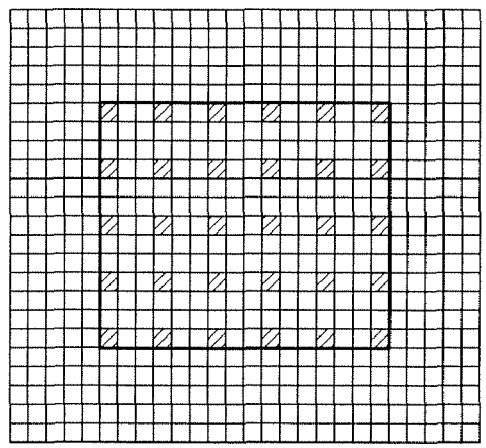
FIG. 12 is a conceptual illustration of a reading method of a solid-state imager apparatus according to a second concrete example of the first embodiment of the invention.

FIG. 12 is a conceptual illustration of a reading method of the solid-state imager apparatus according to the second concrete example of the present invention. Namely, in FIG. 12, ranges of scanning the pixel matrix in a case where, two-pixel interlace scanning is carried out onto only a certain area in the horizontal direction, and two-pixel interlace scanning is carried out only onto only a certain area in the vertical direction are shown. Then, the oblique line portions in FIG. 12 show the pixels to be read out.

Note that the shift registers 4 and 8 of the solid-state imager apparatus according to the second concrete example are as those shown by the configuration of FIG. 15. Then, the vertical shift register 4 and the horizontal shift register 8 appropriately control the vertical shift register control signals 5 and the horizontal shift register control signals 9, whereby progressive scanning as shown above in FIG. 3 and interlace scanning as shown above in FIG. 4, and further, area selecting scanning as shown in FIG. 6 can be obtained.

Hereinafter, the reading method shown in FIG. 11 in accordance with the solid-state imager apparatus according to the second concrete example of the present invention will be described in more detail with reference to timing charts of FIGS. 13 and 14.

First, a relationship between the vertical shift register control signals 5 which are input signals and output signals of the vertical shift register 4 is shown with regard to the reading method as shown above in FIG. 12 in the second concrete example of the present invention is shown in the timing chart of FIG. 13, and will be described in detail.

Here, the description will appropriately refer to FIG. 15. Because the respective configurations of FIG. 15 are duplicate with the above-described contents, and detailed descriptions thereof will be omitted. In the following description, when an attempt is made to distinguish which unit stage of a shift register circuit each information transmitting unit and shift register unit correspond to, reference numerals in parentheses will be used. For example, in a case of the first unit stage, it will be described so as to be the shift register circuit 40(1), the information transmitting units 21-1(1), 21-2(1), and 21-3(1), and the storage unit 32(1).

Figure 13:
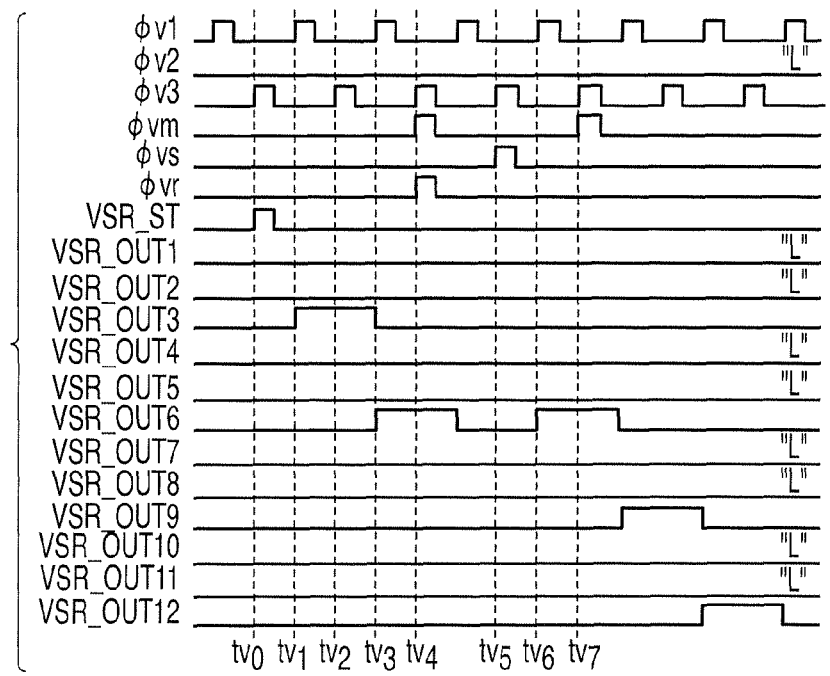
FIG. 13 is a timing chart showing a relationship between vertical shift register control signals 5 which are input signals of a vertical shift register 4 and output signals with respect to the reading method as shown in FIG. 12 in the second concrete example of the first embodiment of the invention.

In FIG. 13, at the vertical shift register 4, when a start pulse VSR_ST is applied and a shift registering operation is being carried out, output signals are outputted in timings when the clock φv1 is made to be at the "H" level. When interlace scanning is carried out, the signals are transmitted to the stages which are plural stages later designated by the interlace scanning shift register unit 4-2 in timings when the clock φv3 is made to be at the "H" level. Here, a pulse signal φvm is a control pulse for storing the output signals from the vertical shift register in the storing unit 4-3 of the vertical shift register 4. A φvs is a control pulse for reading the signals out of the storage unit 4-3 of the vertical shift register 4. Further, a φvr is a control pulse for stopping scanning of the vertical shift register.

By the way, at a time $tv_0$, when the start pulse VSR_ST is applied and the clock φv3 is made to be at the "H" level, the signal is transmitted to the vertical shift register circuit 40(3) at the third stage.

At a time $tv_1$, when the clock φv1 is made to be at the "H" level, the signal is transmitted to an output VSR_OUT3 of the vertical shift register circuit 40(3). At a time $tv_2$, when the clock φv3 is made to be at the "H" level, the signal is transmitted to the vertical shift register circuit 40(6) at the sixth stage. At a time $tv_3$, when the clock φv1 is made to be at the "H" level, the signal is transmitted to an output VSR_OUT6 of the vertical shift register circuit 40(6), and two-pixel interlace scanning is repeated.

Next, at a time $tv_4$, when φvm is made to be at the "H" level, an output signal from the VSR_OUT 6 is stored in the storage unit 32(6) of the vertical shift register circuit 40(6) at the sixth stage, and at the same time, due to the φvr being made to be at the "H" level, the scanning of the vertical shift register is stopped.

Next, at a time $tv_5$, when the φvs is made to be at the "H" level, the signal is transmitted to the information transmitting unit 21-1(6) from the storage unit 32(6) of the vertical shift register circuit 40(6) at the sixth stage. Then, at a time $tv_6$, when the clock φv1 is made to be at the "H" level, the signal is transmitted to the output VSR_OUT6 of the vertical shift register circuit 40(6), and at a time tv7, when the clock φvm is made to be at the "H" level, an output signal from the output VSR_OUT6 is stored in the storage unit 32(6) of the vertical shift register circuit 40(6) at the sixth stage again.

Hereinafter, two-pixel interlace scanning is repeated from the sixth stage on. As described above, due to the φvm, the φvs, and the φvr being appropriately controlled, scanning can be carried out onto only an arbitrary range.

Next, a relationship between the horizontal shift register control signals 9 which are input signals of the horizontal shift register 8 and output signals with regard to the reading method as shown above in FIG. 12 in the second concrete example of the present invention is shown in the timing chart of FIG. 14, and will be described in more detail.

Here, the description will appropriately refer to FIG. 15. Because the respective configurations of FIG. 15 are duplicate with the above-described contents, and detailed descriptions thereof will be omitted. In the following description, when an attempt is made to distinguish which unit stage of a shift register circuit each information transmitting unit and shift register unit correspond to, reference numerals in parentheses will be used. For example, in a case of the first unit stage, it will be described so as to be the shift register circuit 40(1), the information transmitting units 21-1(1), 21-2(1), and 21-3(1), and the storage unit 32(1).

Figure 14:
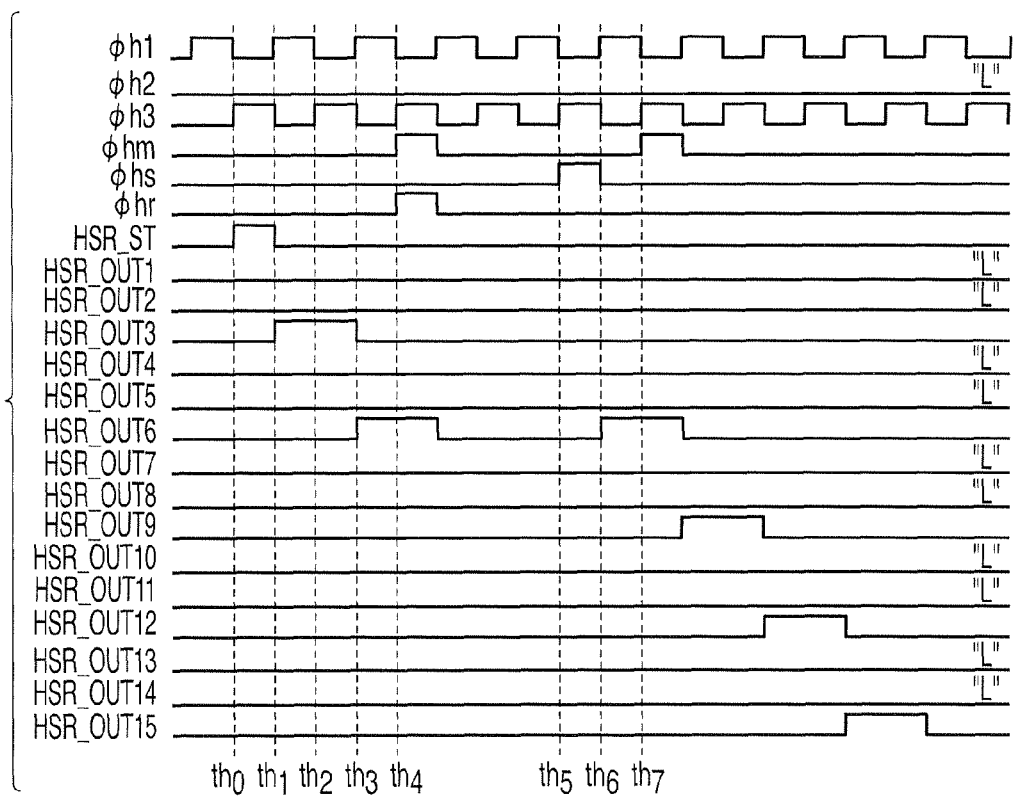
FIG. 14 is a timing chart showing a relationship between horizontal shift register control signals 9 which are input signals of a horizontal shift register 8 and output signals with respect to the reading method as shown in FIG. 12 in the second concrete example of the first embodiment of the invention.

In FIG. 14, at the horizontal shift register 8, when a start pulse HSR_ST is applied and a shift registering operation is being carried out, output signals are outputted in timings when a clock φh1 is made to be at the "H" level. When interlace scanning is carried out, signals are transmitted to the stages which are plural stages later designated by the interlace scanning shift register unit 8-2 in timings when a clock φh3 is made to be at the "H" level. Here, a pulse signal φhm is a control pulse for storing the output signals from the horizontal shift register in the storage unit 8-3 of the horizontal shift register 8. A φhs is a control pulse for reading the signals out of the storage unit 8-3 of the horizontal shift register 8. Further, a φhr is a control pulse for stopping scanning of the horizontal shift register.

By the way, at a time $th_0$, at the same time when a start pulse HSR_ST is applied, the clock φh3 is made to be at the "H" level, and the signal is transmitted to the horizontal shift register circuit 40(3) at the third stage. Next, at a time $th_1$, when the clock φh1 is made to be at the "H" level, the signal is outputted to an output HSR_OUT3 of the horizontal shift register circuit 40(3).

Then, at a time $th_2$, when the clock φh3 is made to be at the "H" level, the signal is transmitted to the horizontal shift register circuit 40(6) at the sixth stage.

Moreover, at a time $th_3$, when the clock φh1 is made to be at the "H" level, the signal is transmitted to an output HSR_OUT6 of the horizontal shift register circuit 40(6), and two-pixel interlace scanning is repeated.

Then, at a time $th_4$, when the φhm is made to be at the "H" level, an output signal from the HSR_OUT6 is stored in the storage unit 32(6) of the horizontal shift register circuit 40(6) at the sixth stage, and at the same time, the φhr is made to be at "H" level, and therefore, the scanning of the horizontal shift register is stopped.

Next, at a time $th_5$, when the φhs is made to be at the "H" level, the signal is transmitted to the information transmitting unit 21-1(6) from the storage unit 32(6) of the horizontal shift register circuit 40(6) at the sixth stage. Then, at a time $th_6$, when the clock φh1 is made to be at the "H" level, the signal is transmitted to the output HSR_OUT6 of the horizontal shift register circuit 40(6).

Then, at a time $th_7$, when the clock φhm is made to be at the "H" level, an output signal from the output HSR_OUT6 is stored in the storage unit 32(6) of the horizontal shift register circuit 40(6) at the sixth stage again. Hereinafter, two-pixel interlace scanning is repeated from the sixth stage on.

In the second concrete example, as described above, due to the φhm, the φhs, and the φhr being appropriately controlled, horizontal scanning can be carried out onto only an arbitrary range. Moreover, in the second concrete example, as described above, interlace reading can be carried out so as to select only an arbitrary area due to a combination of the vertical shift register control signals 9 and the horizontal shift register control signals 5.

In the second concrete example of the present invention described above, the method in which only some areas of the pixel matrix are read while horizontal and vertical two-pixel interlace scannings are being carried out has been shown. However, it goes without saying that the interlace scanning may be carried out only in the horizontal direction or the vertical direction. Further, as the number of interlace of the interlace scanning, a desired value can be obtained by changing the configurations of the respective interlace scanning shift register units 4-2 and 8-2.

Moreover, an arbitrary area is selected by a combination of the horizontal shift register control signals 5 and the vertical shift register control signals 9, and the area may be read out by combining progressive scanning and interlace scanning.

In this way, in the solid-state imager apparatus according to the second concrete example of the present invention, because reading of an area is carried out while interlace the pixels by operating the vertical shift register control signals 5 and the horizontal shift register control signals 9, a frame rate can be switched while maintaining to fix a reading region, and it is possible to read the area at a high-speed.

Next, as a third concrete example of the present invention, a camera to which the solid-state imager apparatus according to the first and second concrete examples described above is applied will be described in detail with reference to the conceptual illustration of FIG. 16.

As shown in FIG. 16, a solid-state imager apparatus 51 is disposed on an optical path of an object light which is incident via an imaging lens 50. Then, the output of the solid-state imager apparatus 51 is connected to an input of a direct current restoring unit (CDS) 54, and moreover, an output of the direct current restoring unit 54 is connected to inputs of a contrast AF detecting unit 55 and an image processing unit 56 via a switch unit 60.

A zoom lens conceptually included in the imaging lens 50 is controlled to drive on the basis of a detected result of the contrast AF detecting unit 55. An output of the image processing unit 56 is connected to inputs of a display unit 57 such as an LCD and a medium recording unit 58. An output of a synchronous timing generating unit 52 for generating clock signals is connected to the inputs of the direct current restoring unit 54 and a scanning control unit 53. A mode switching unit 59 for setting various modes as well is connected to the scanning control unit 53.

In such a configuration, an object light which is incident via the imaging lens 50 is picked up by the solid-state imager of the solid-state imager apparatus 51, and pixel signals are outputted. At that time, the scanning control unit 53 is controlled on the basis of various modes set by the mode switching unit 59, and vertical shift register control signals and horizontal shift register control signals are outputted to a horizontal shift register and a vertical shift register in the solid-state imager apparatus 51 so as to achieve the interlace scanning, the progressive scanning, the reading of an area described above, and the like. On the basis of the control signals, driving as in the first and second concrete examples described above is carried out, reading of an area while interlace the pixels is carried out, and a frame rate is switched while maintaining to fix a reading region. Moreover, high-speed reading of an area is carried out.

Correlated double sampling is carried out onto the pixel signals in the direct current restoring unit 54, and by further carrying out A/D conversion onto the pixel signals, the pixel signals are converted into digital picture signals, and the digital picture signals are transmitted to the contrast A/F detecting unit 55 or the image processing unit 56 in accordance with a state of switching by the switch unit 60. At the contrast A/F detecting unit 55, detection of an object distance based on the digital picture signals is carried out. On the other hand, at the image processing unit 56, for example, color signal generating processing, matrix conversion processing, and other various image processings are carried out, and the processed signals are outputted to the display unit 57 or the medium recording unit 58. On this display unit 57, various displays are carried out on the basis of the digital picture signals. On the other hand, the medium recording unit 58 is configured by, for example, a card interface, a memory card, and the like, and the digital picture signals are recorded in the medium recording unit 58.

In this way, in the camera according to the third concrete example of the invention, in the solid-state imager apparatus, by carrying out reading-out due to a combination of progressive scanning and interlace scanning, or reading of an area while interlace the pixels, on the basis of the vertical shift register control signals 9 and the horizontal shift register control signals 5, a frame rate can be switched while maintaining to fix a reading region. Therefore, it is possible to read the area at a high-speed, and as a result, reading methods suitable for various (AF, display, recording, or the like) modes can be selected.

Namely, the interlace scanning is suitable for a case where continuous display is carried out at a short frame rate on the display unit 57, and reading of an area is suitable for a case where the pixel signals are obtained from the respective portions on the screen and a contrast value is analyzed, and multiple A/F is carried out. A combination of those is suitable for, for example, a case where display is carried out so as to follow up a high-speed object, or the like. However, it is easily realized in such a manner that the scanning control unit 53 controls the output timings of the vertical shift register control signals and the horizontal shift register control signals on the basis of a setting of the above-described mode switching unit 59.

The best modes for implementing the present invention has been described above. However, the present invention is not limited to the first to third concrete examples described above, and it goes without saying that various improvements and modifications are possible within a range which does not deviate from the gist of the present invention.

Second Embodiment

Figure 17:
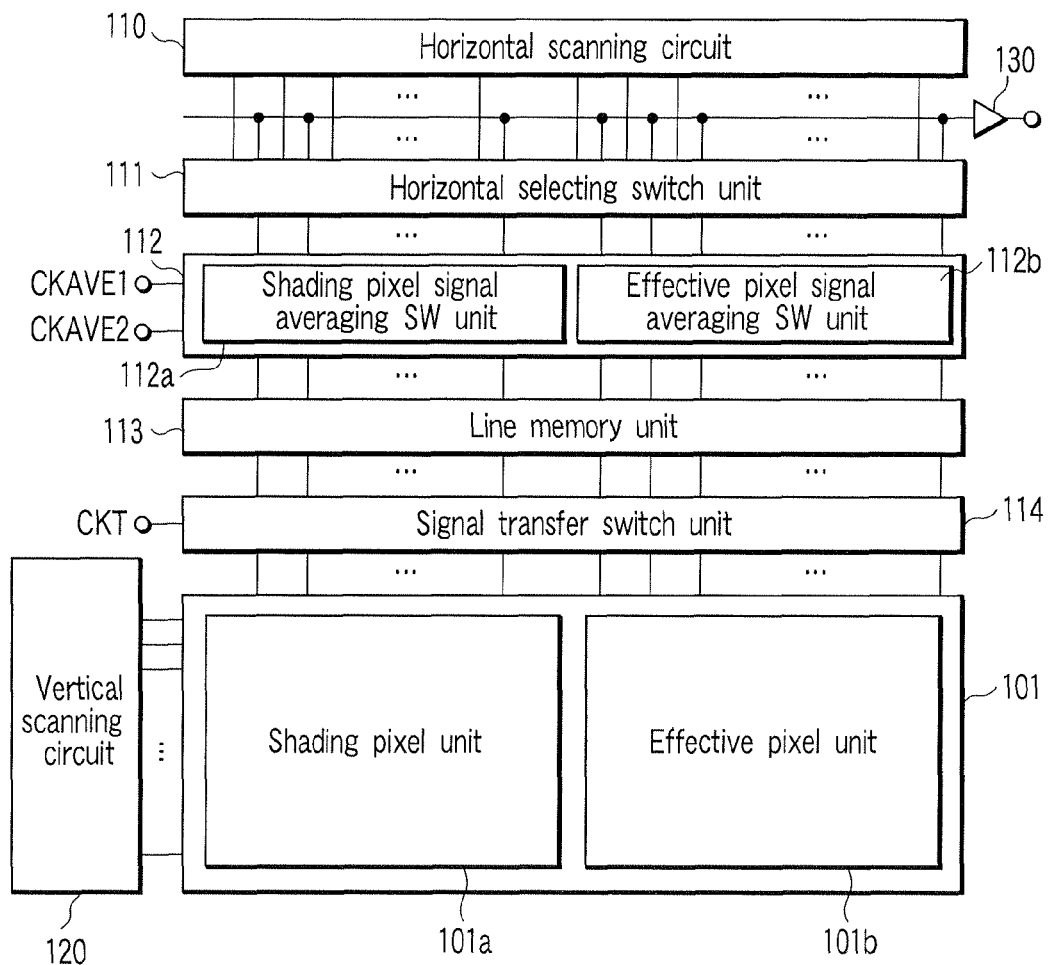
FIG. 17 is a conceptual illustration of a solid-state imager apparatus according to a second embodiment of the present invention.
Figure 18:
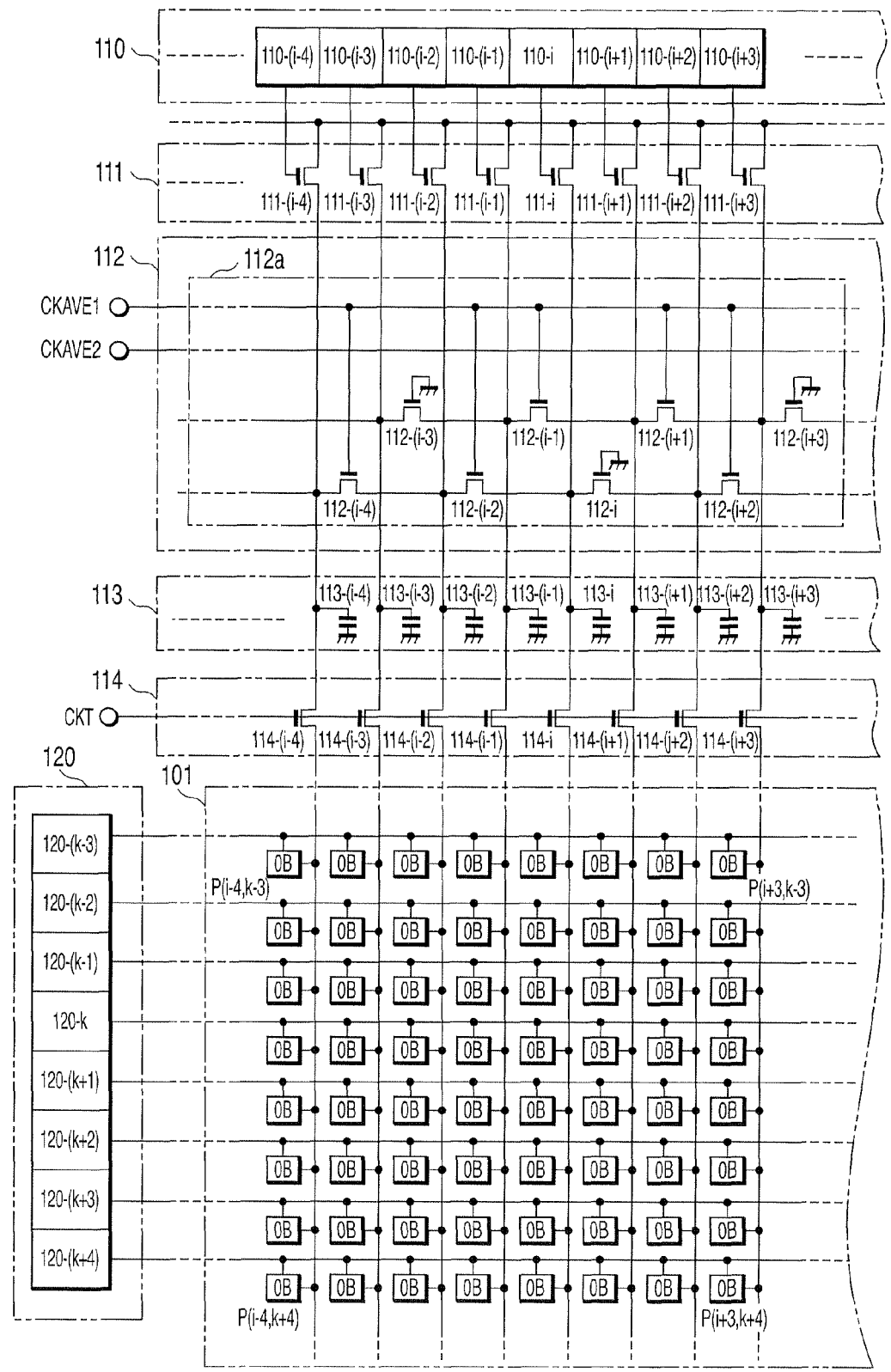
FIG. 18 is a block diagram showing a part of the configuration of FIG. 17 which is further implemented.
Figure 19:
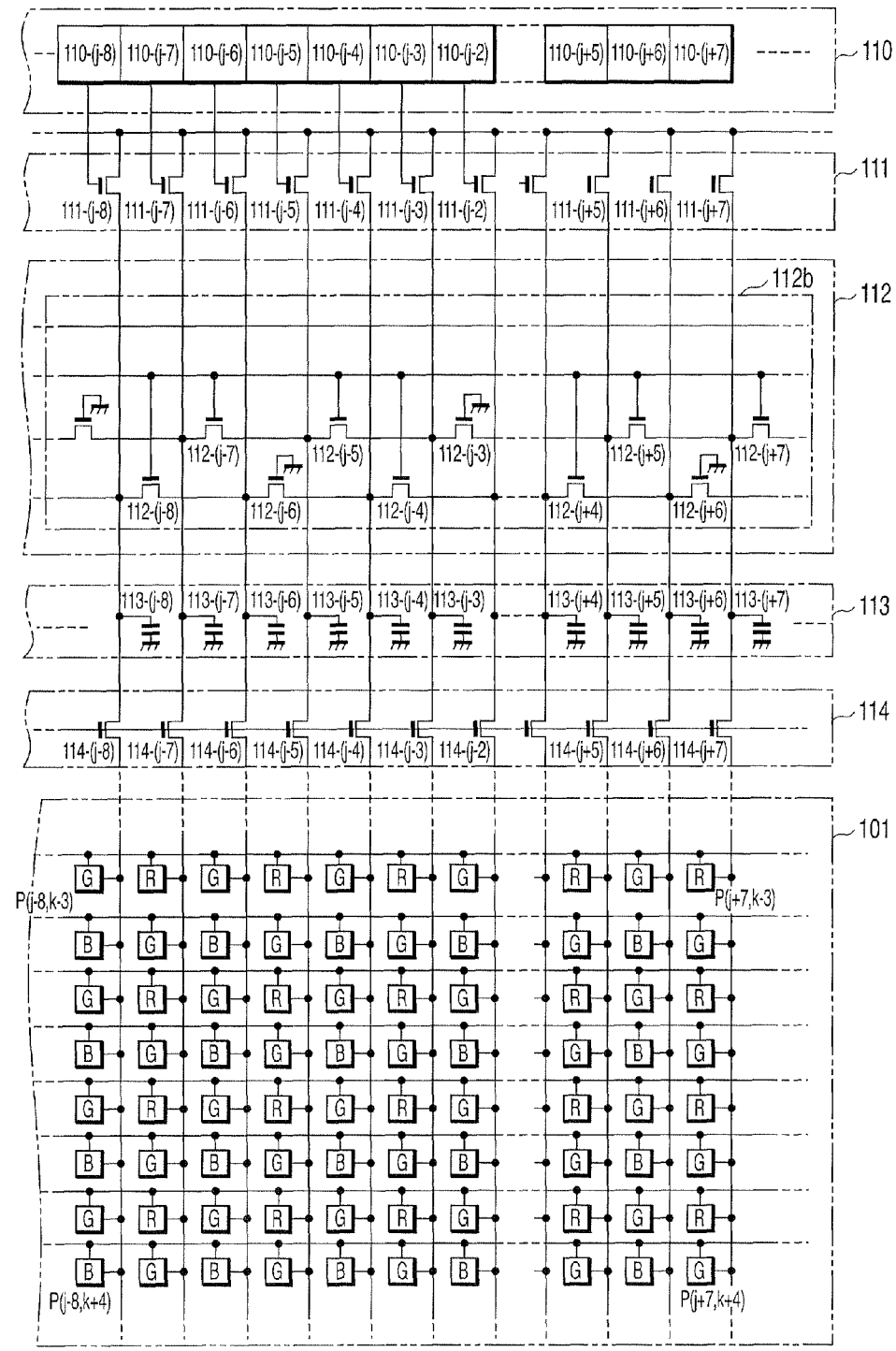
FIG. 19 is a block diagram showing a part of the configuration of FIG. 17 which is further implemented.

First, a conceptual illustration of a solid-state imager apparatus according to a second embodiment of the present invention is shown in FIG. 17, and block diagrams showing the configuration of FIG. 17 which is further implemented are shown in FIGS. 18 and 19. Hereinafter, the solid-state imager apparatus according to the second embodiment of the present invention will be described in detail with reference to these FIGS. 17 to 19.

In these FIGS. 17 to 19, a pixel portion 101 serving as a solid-state imager is configured such that a plurality of pixels are two-dimensionally arranged in a matrix form. In more detail, the pixel portion 101 is configured by a shading pixel portion 101a which outputs a signal corresponding to a black level, and an effective pixel portion 101b which receives an object light and generates an electric charge to output a pixel signal. Further, the surface of the respective pixels of the shading pixel portion 101a is covered with, for example, a shading film such as aluminum or the like, and color filters are disposed on the surfaces of the respective pixels of the effective pixel portion 101b. Moreover, P(i−4, k−3) to P(i+3, k+4) shown in FIG. 18 denote a plurality of pixel addresses of the shading pixel portion 101a which are arranged in the pixel portion 101, and P(j−8, k−3) to P(j+7, k+4) shown in FIG. 19 denote a plurality of pixel addresses of the effective pixel portion 101b which are arranged in the pixel portion 101.

Moreover, "R", "G", and "B" shown in FIGS. 18 and 19 respectively denote pixels which are sensitive to a red light among the effective pixels (hereinafter, R pixels), pixels which are sensitive to a green light among the effective pixels (hereinafter, G pixels), and pixel which are sensitive to a blue light among the effective pixels (hereinafter, B pixels). With respect to the R pixels, G pixels, and B pixels, the G pixels are arranged in a checkered form, and the R pixels and the B pixels are line-progressively arranged (in a Bayer pattern) at the remaining other portions. "OB" denotes a shading pixel.

A vertical scanning circuit 120 progressively scans vertical signal lines by row selection signals, and progressively reads pixel signals from the shading pixel portion 101a and the effective pixel portion 101b. Then, the vertical scanning circuit 120 is configured by n (n is a natural number) vertical scanning circuit units. Codes 120-(k−3) to 120-(k+4) denote vertical scanning circuit units in the vicinity of the kth (k is a natural number) vertical scanning circuit unit among the n vertical scanning circuit units.

A signal transfer switch unit 114 is controlled to drive by a signal transfer clock CKT. In more detail, signal transfer switches 114-(i−4) to 114-(i+3) and 114-(j−8) to 114-(j+7) which configure the signal transfer switch unit 114 transfer the pixel signals in the rows selected by the vertical scanning circuit 120 to capacitative elements 113-(i−4) to 113-(i+3) and 113-(j−8) to 113-(j+7) at the following stages.

A line memory unit 113 is configured by m (m is a natural number) capacitative elements, and temporarily stores the signals of pixels of one row. The codes 113-(i−4) to 113-(i+3) and 113-(j−8) to 113-(j+7) shown in FIGS. 18 and 19 denote the capacitative elements in the vicinities of the ith (i is a natural number) and the jth (j is a natural number) capacitative elements among the m capacitative elements.

A signal averaging switch unit 112 is a switch for averaging the signals stored in the line memory unit 113, and is broadly divided into a shading pixel signal averaging switch unit 112a for averaging the signals of the shading pixels stored in the line memory unit 113 and an effective pixel signal averaging switch unit 112b for averaging the signals of the effective pixels stored in the line memory unit 113.

The shading pixel signal averaging switch unit 112a is arranged every other column, and when a clock CKAVE1 is made to be at the "H" level, a predetermined number (here three columns) of shading pixel signals are averaged. For example, when the clock CKAVE1 is made to be at the "H" level, the shading pixel signal averaging switches 112-(i−1) and 112-(i+1) are operated so as to electrically connect to the capacitative elements 113-(i−1), 113-(i+1), and 113-(i+3). Further, for example, the shading pixel signal averaging switches 112-(i−3) and 112-(i+3), or the like are provided such that the circuit configuration for each column, i.e., the layout is made to be uniform, and are connected so as to not function even when the clock CKAVE1 is made to be at the "H" level. In accordance with such a connection, it is made to be the same as the connecting form of the effective pixel signal averaging switch unit 112b.

On the other hand, the effective pixel signal averaging switch unit 112b is configured such that the respective signals of the R pixels, the G pixels, and the B pixels are averaged in units of a predetermined number pixels (here, three pixels), and are connected so as to be controlled by a clock CKAVE2.

In this way, in the present embodiment, the pixel signal averaging switch unit 112 is configured such that, with respect to the signals of the shading pixels among the signals stored in the line memory unit 113, averaging of the signals of three pixels is controlled by the clock CKAVE1 by the shading pixel signal averaging switch unit 112a, and with respect to the signals of the effective pixels, averaging of the signals of three pixels of a same color is controlled by the clock CKAVE2 by the effective pixel signal averaging switch unit 112b.

A horizontal scanning circuit 110 is for progressively driving the horizontal selecting switch unit 111, and is configured by m horizontal scanning circuit units. Namely, codes 110-(i−4) to 110-(i+3) and 110-(j−8) to 110-(j+7) denote horizontal scanning circuit units in the vicinities of the ith and the jth horizontal scanning circuit units among the m horizontal scanning circuit units.

The horizontal selecting switch unit 111 is controlled by outputs (horizontal selection signals) of the horizontal scanning circuit unit 110, and is configured by m horizontal selecting switches. Codes 111-(i−4) to 111-(i+3) and 111-(j−8) to 111-(j+7) in FIGS. 18 and 19 denote horizontal selecting switches in the vicinities of the ith and the jth horizontal selecting switches among the m horizontal selecting switches. Then, in the horizontal selecting switch unit 111, when the respective horizontal selecting switches are made to be in an ON-state by horizontal selection signals, the pixel signals stored in the line memory unit 113 are transmitted to the horizontal signal lines, and moreover, the pixel signals are amplified by an output amplifier 130 at the following stage and are outputted to the exterior.

In the above-described configuration, the present embodiment is a solid-state imager apparatus comprising the pixel portion 101 on which Bayer-patterned color filters are provided. The solid-state imager apparatus carries out interlace reading for pixels in one frame, and with respect to the pixels, the solid-state imager apparatus averages the pixel signals of the pixels which are at a same color phase among the color phase coding regulated by the above-described color filters are averaged and outputted.

In more detail, an XY address type solid-state imager apparatus is configured by the pixel portion 101 in which a plurality of pixels having color filters in which at least some of those are Bayer-patterned are two-dimensionally arranged, the horizontal scanning circuit 110 and the vertical scanning circuit 120 which are for carrying out reading of the pixel signals of the pixels. The XY address type solid-state imager apparatus has the signal averaging switch unit 112 for averaging the pixel signals of the pixels which are at a same color phase among the color phase coding regulated by the above-described color filters. In addition, the XY address type solid-state imager apparatus carries out interlace reading for the pixels in one frame on the basis of the controls of the above-described scanning circuits 110 and 120, and outputs signals in which the pixels are averaged by the above-described signal averaging switch unit 112.

Moreover, the above-described pixel portion 101 is configured by the shading pixel portion 101a and the effective pixel portion 101b, and the signal averaging switch unit 112 further averages the signals of predetermined pixels among the signals relating to the pixels of the shading pixel portion 101a. At that time, the signals relating to the pixels of the shading pixel portion 101a are progressively read out in one frame. Then, the signal averaging switch unit 112 comprises the shading pixel signal averaging switch unit 112a and the effective pixel signal averaging switch unit 112b. The signal averaging switch unit 112 controls whether or not it is possible to average the signals relating to the shading pixels due to the shading pixel signal averaging switch unit 112a by a first signal (CKAVE1), and controls whether or not it is possible to average the pixel signals of the pixels which are at a same color phase among the coding of the color phases regulated by the color filters due to the effective pixel signal averaging switch unit 112b by a second signal (CKAVE2).

Hereinafter, the operations of the solid-state imager apparatus configured as described above will be described in more detail with reference to the timing charts of FIGS. 20 and 21. Note that the timings shown by codes "a" to "p" in FIG. 20 respectively correspond to the timings shown by the same codes in FIG. 21.

Figure 20:
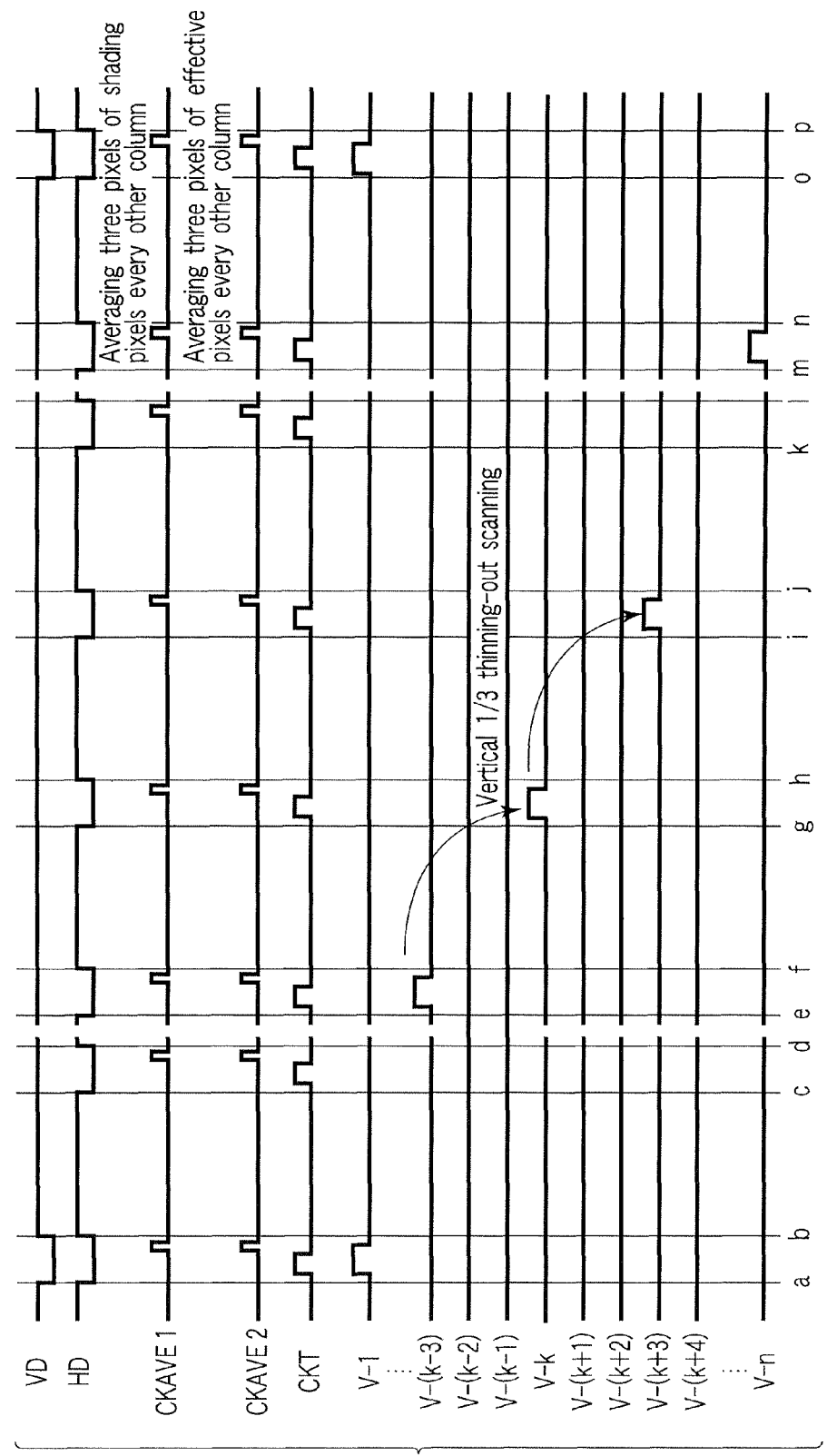
FIG. 20 is a timing chart (No. 1) showing operations of the solid-state imager apparatus according to the second embodiment of the invention.
Figure 21:
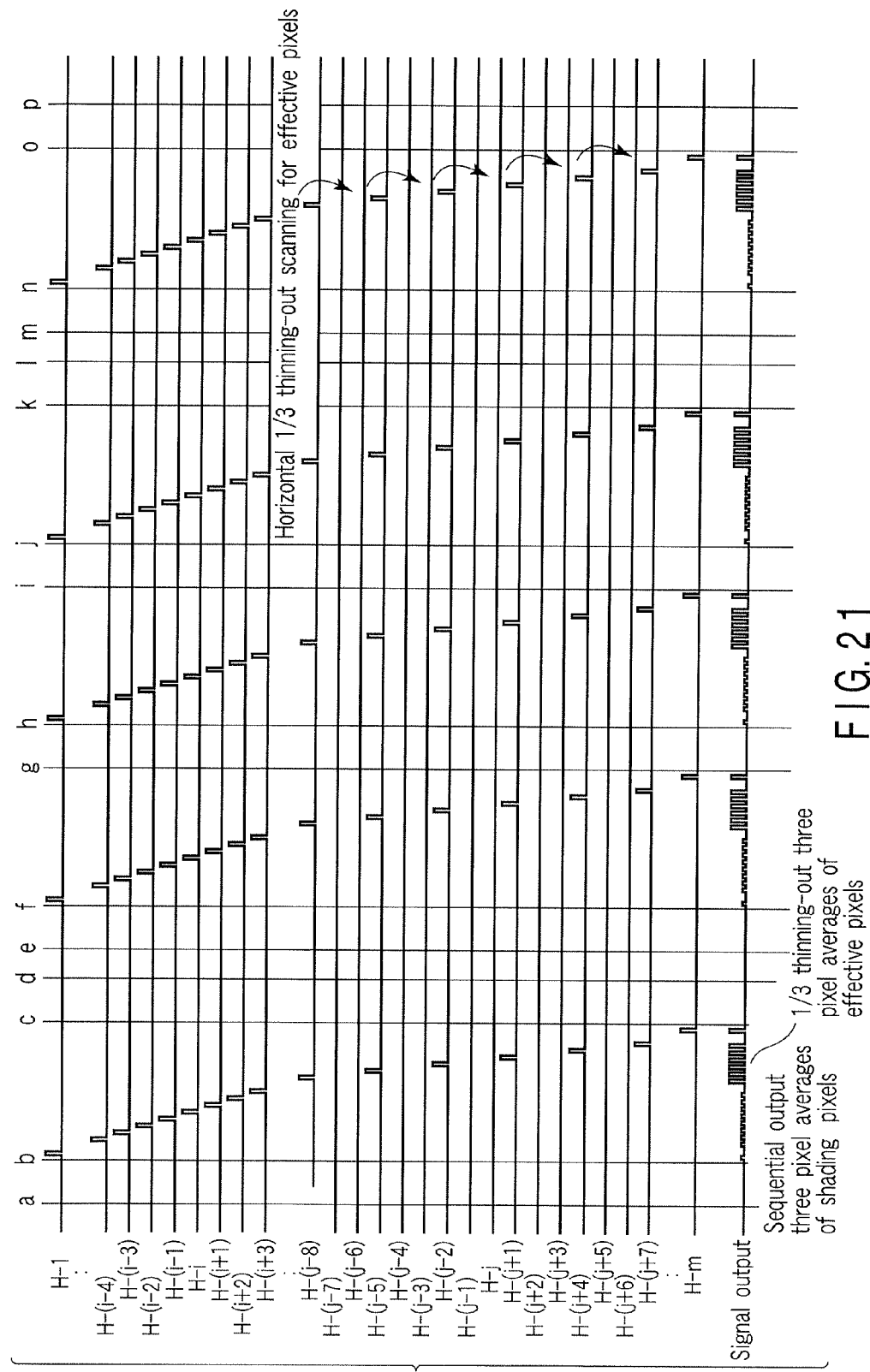
FIG. 21 is a timing chart (No. 2) showing operations of the solid-state imager apparatus according to the second embodiment of the invention.

In FIGS. 20 and 21, "VD" is a vertical synchronizing signal, "HD" is a horizontal synchronizing signal, "CKAVE1" is a clock which controls to turn the shading pixel signal averaging switch unit 112a ON and OFF, "CKAVE2" is a clock which controls to turn the effective pixel signal averaging switch unit 112b ON and OFF, and "CKT" is a clock which controls to turn the signal transfer switch unit 1140N and OFF.

"V-1" to "V-n" are row selection signals, and are the outputs of the vertical scanning circuit units 120-1 to 120-n. "H-1" to "H-m" are horizontal selection signals for controlling the horizontal selecting switches 111-1 to 111-m, and are the output signals from the horizontal scanning circuit units 110-1 to 110-m. In addition to the above description, "signal output" is a pixel signal outputted from the output amplifier 130.

By the way, when the routine proceeds to this operation, the vertical scanning circuit 120 carries out scanning of skipping two rows in the direction of the arrangement of the vertical scanning circuit units 120-1 to 120-n, such as, for example, 120-1, ..., 120-(k−3), 120-k, 120-(k+3), ..., 120-n, i.e., vertical ⅓ interlace scanning.

Namely, when a row selection signal V-(k−3) outputted from the vertical scanning circuit 120 is made to be at the "H" level within a horizontal blanking period (a period during the time when the horizontal synchronizing signal HD is being at the "H" level), the pixels P(l, k−3) to P(m, k−3) in the (k−3)th row are selected.

During this period, because the signal transfer clock CKT inputted to the signal transfer switch unit 114 is at the "H" level, the pixel signals of the selected pixels P(l, k−3) to P(m, k−3) are stored in the capacitative elements 113-1 to 113-m. Thereafter, because the clocks CKAVE1 and CKAVE2 inputted to the pixel signal averaging switch unit 112 are at the "H" level, the signals of three pixels in every other column are averaged, and are stored in the line memory unit 113.

Namely, for example, an average of the signals stored in the capacitative elements 113-(i−4), 113-(I−2), and 113-i is stored as an average signal of the shading pixels of three pixels, and for example, an average of the signals stored in the capacitative elements 113-(j−1), 113-(j+1), and 113-(j+3) is stored as an average signal of the effective pixels of three pixels, respectively in the line memory unit 113. In accordance with such an operation, averaging of three pixels of a horizontal same color of the Bayer-patterned R pixels and G pixels is carried out.

Thereafter, when scanning/selection signals are outputted to the horizontal scanning circuit units 110-1 to 110-m within a horizontal effective period (a period during the time when the horizontal synchronizing signal HD is being at the "H" level), and in a case of selecting the shading pixel signals, progressive scanning is progressively carried out such that the horizontal selection signals are outputted one unit by one unit in a progressive order (H-1, ..., H-(i−4), H-(i−3), H-(i−2), H-(i−1), H-i, H-(i+1), H-(i+2), H-(i+3), H-(i+4), ...).

On the other hand, in a case of selecting the effective pixel signals, scanning such that the horizontal selection signals are outputted from one unit of the three units, i.e., ⅓ interlace scanning (..., H-(j−8), H-(j−5), H-(j−2), H-(j+1), H-(j+4), H-(j+7), ...) is carried out.

When the horizontal scanning is carried out in this way, the three-pixel average signals of the shading pixels and the three-pixel average signals of the effective pixels which have been stored in the line memory unit 113 are transmitted to the horizontal signal lines via the horizontal selecting switch unit 111, and are further amplified at the output amplifier 130 at the following stage and are converted into signal outputs.

At this time, the three-pixel average signals of the shading pixels are progressively outputted, and the three-pixel average signals of the effective pixels are outputted so as to interlaced the number of the signals to be ⅓ thereof. In this way, three pixels of the pixel signals of one row are averaged, and signals of the number of the shading pixels and signals of ⅓ the number of the effective signals are outputted.

In the next horizontal blanking period, because the vertical scanning circuit 120 carries out ⅓ interlace scanning, a row selection signal V-k from the vertical scanning circuit 120 is made to be at the "H" level. When the row selection signal V-k is made to be at the "H" level within the horizontal blanking period, the pixels P(l, k) to P(m, k) in the kth row are selected. During this period, the signal transfer clock CKT inputted to the signal transfer switch unit 114 is at the "H" level, the pixel signals of the selected pixels P(l, k) to P(m, k) are stored in the capacitative elements 113-1 to 113-m of the line memory unit 113.

Thereafter, because the clocks CKAVE1 and CKAVE2 inputted to the signal averaging switch unit 112 are at the "H" level, the signals of three pixels in every other column are averaged, and the three-pixel average signals of the shading pixels and the three-pixel average signals of the effective signals are respectively stored in the line memory unit 113.

In accordance with the above-described operation, averaging of three pixels of a horizontal same color of the Bayer-patterned G pixels and B pixels is carried out. Thereafter, when the scanning/selection signals are outputted to the horizontal scanning circuit units 110-1 to 110-m within a horizontal effective period, in a case of selecting the shading pixel signals, the horizontal scanning is progressively carried out such that the horizontal selection signals are outputted one unit by one unit in a progressive order (H-1, ..., H-(i−4), H-(i−3), H-(i−2), H-(i−1), H-i, H-(i+1), H-(i+2), H-(i+3), H-(i+4), ...). In a case of selecting the effective pixel signals, ⅓ interlace scanning is carried out such that the horizontal selection signals are outputted from one unit of the three units (..., H-(j−8), H-(j−5), H-(j−2), H-(+1), H-(j+4), H-(j30 7), ...).

When the horizontal scanning is carried out in this way, the three-pixel average signals of the shading pixels and the three-pixel average signals of the effective pixels which have been stored in the line memory unit 113 are transmitted to the horizontal signal lines via the horizontal selecting switch unit 111, and are further amplified at the output amplifier and are converted into signal outputs.

At this time, the three-pixel average signals of the shading pixels are progressively outputted, and the three-pixel average signals of the effective pixels are outputted so as to interlaced the number of the signals to be ⅓ thereof. In this way, three pixels of the pixel signals of one row are averaged, and the signals of the number of the shading pixels and the signals of ⅓ of the number of the effective signals are outputted.

Hereinafter, the pixels in the (k+3)th row to the nth row are selected every third row within the vertical blanking period in the same way, and the pixel signals in each row are outputted within the horizontal effective period.

In accordance with the above-described reading operation, vertical ⅓ interlace reading, horizontal progressively reading of the average signals of the three pixels of the shading pixels, and horizontal ⅓ interlace reading of the average signals of the three pixels of a same color of the effective pixels are carried out. Due to the apparatus being operated in this way, because the number of effective pixels to be read are horizontally and vertically compressed into ⅓, it is possible to read at a high frame rate.

At this time, because the signals of the three pixels of a horizontal same color are averaged and outputted, a pseudo-color in the horizontal direction generated by carrying out interlace reading can be suppressed. Further, the circuit scale can be materially reduced as compared with the case where averaging in the vertical direction is carried out. Moreover, because progressive reading is carried out in a case of reading the shading pixels, a period during the time of clamping to a shading pixel signal level can be ensured so as to be the same as in the case of progressive reading.

Next, a camera to which the solid-state imager apparatus according to the embodiment described above is applied will be described in detail with reference to a conceptual illustration of FIG. 22.

Figure 22:
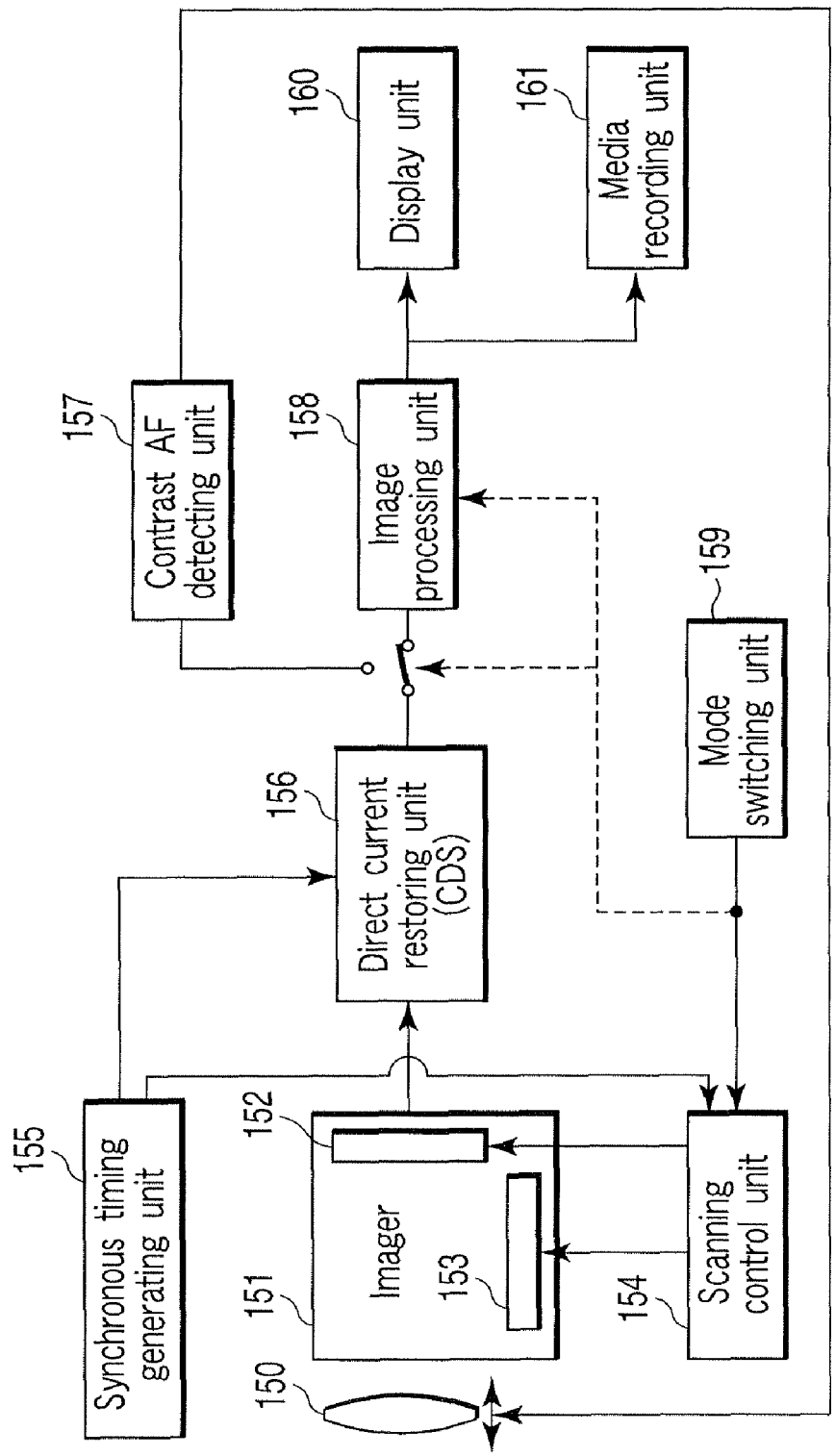
FIG. 22 is a block diagram of a camera to which the solid-state imager apparatus according to the second embodiment of the present invention is applied.

As shown in FIG. 22, a solid-state imager apparatus 151 is disposed on an optical path of an object light which is incident via an imaging lens 150. Then, an output of the solid-state imager apparatus 151 is connected to an input of a direct current regenerating unit (CDS) 156, and moreover, an output of the direct current regenerating unit 156 is connected to inputs of a contrastAF detecting unit 157 and an image processing unit 158 via a switch unit.

A zoom lens conceptually included in the imaging lens 150 is controlled to drive on the basis of a detected result of the contrast AF detecting unit 157. An output of the image processing unit 158 is connected to an input of a display unit 160 such as an LCD, and a medium recording unit 161. An output of a synchronous timing generating unit 155 for generating a clock signal is connected to the inputs of the direct current regenerating unit 156 and a scanning control unit 154. A mode switching unit 159 for setting various modes as well is connected to the scanning control unit 154.

In such a configuration, an object light which is incident via the imaging lens 150 is picked up by the solid-state imager of the solid-state imager apparatus 101, and a pixel signal is outputted.

At that time, the scanning control unit 154 is controlled on the basis of the various modes set by the mode switching unit 159, and a vertical shift register control signals and horizontal shift register control signals are outputted to a horizontal scanning circuit 153 and a vertical scanning circuit 152 in the solid-state imager apparatus 101 so as to achieve the interlace scanning described above, or the like. On the basis of this control signal, driving as described above is carried out, and reading while interlace pixels is carried out.

Correlated double sampling is carried out onto the pixel signal in the direct current regenerating unit 150, A/D conversion is further carried out onto the pixel signal, the pixel signal is converted into a digital picture signal, and the digital picture signal is transmitted to the contrast A/F detecting unit 157 or the image processing unit 158 in accordance with a state of switching by the switch unit. At the contrast A/F detecting unit 157, detection of an object distance based on the digital picture signal is carried out. On the other hand, at the image processing unit 158, for example, color signal generating processing, matrix conversion processing, and other various image processings are carried out, and the processed signal is outputted to the display unit 160 or the medium recording unit 161. On this display unit 160, various displays are carried out on the basis of the digital picture signal. On the other hand, the medium recording unit 161 is configured by, for example, a card interface, a memory card, and the like, and the digital picture signal is recorded thereon in the medium recording unit 161.

In the camera as an application example, at the solid-state imager apparatus in the camera, by carrying out reading due to interlace scanning, a frame rate is improved, and it is possible to read an area at a high-speed, and as a result, reading methods suitable for various (AF, display, recording, or the like) modes can be selected. Namely, the interlace scanning is suitable for a case where continuous display is carried out at a short frame rate on the display unit 160. However, it is easily realized in such a manner that the scanning control unit 154 controls the output timings of the vertical shift register control signals and the horizontal shift register control signals on the basis of a setting of the above-described mode switching unit 159.

The embodiment of the present invention has been described above. However, the present invention is not limited thereto, and it goes without saying that various improvements and modifications are possible within a range which does not deviate from the gist of the present invention.

Namely, for example, the circuit configurations shown in FIGS. 17 to 19 are not limited thereto, and it is possible to provide a function of canceling FPN of a pixel to the reading circuit, or the like.

Further, in the embodiment, the configuration in which it is possible to average horizontal three pixels has been shown. However, it can be configured such that it is possible to average horizontal five pixels or to average horizontal seven pixels by changing a repeating period of the signal averaging switches, and it can be configured such that a plurality of averaging operations can be selectively carried out. Also, in the embodiment described above, it is configured such that signal output is carried out on one line. However, it goes without saying that it can be carried out such that signal output can be carried out on multiple lines.

Furthermore, in the timing charts of FIGS. 20 and 21, the shading pixel signals can be read without being averaged due to the CKAVE1 being maintained to be at the "L" level, and the effective pixel signals can be read without being averaged due to the CKAVE2 being maintained to be at the "L" level.

In the above-described embodiment of the invention, the operations of the horizontal scanning circuits and the vertical scanning circuits by which ⅓ interlace scanning can be carried out has been described. However, in order to carry out such an operation, as an apparatus using a decoder circuit or an apparatus using a shift register as a scanning circuit, for example, it can be realized by a method for interlace scanning disclosed in Jpn. Pat. Appln. KOKAI Publication No. 9-163245, and it goes without saying that it is possible to progressively read all the pixels by carrying out progressive scanning.

Figure 23:
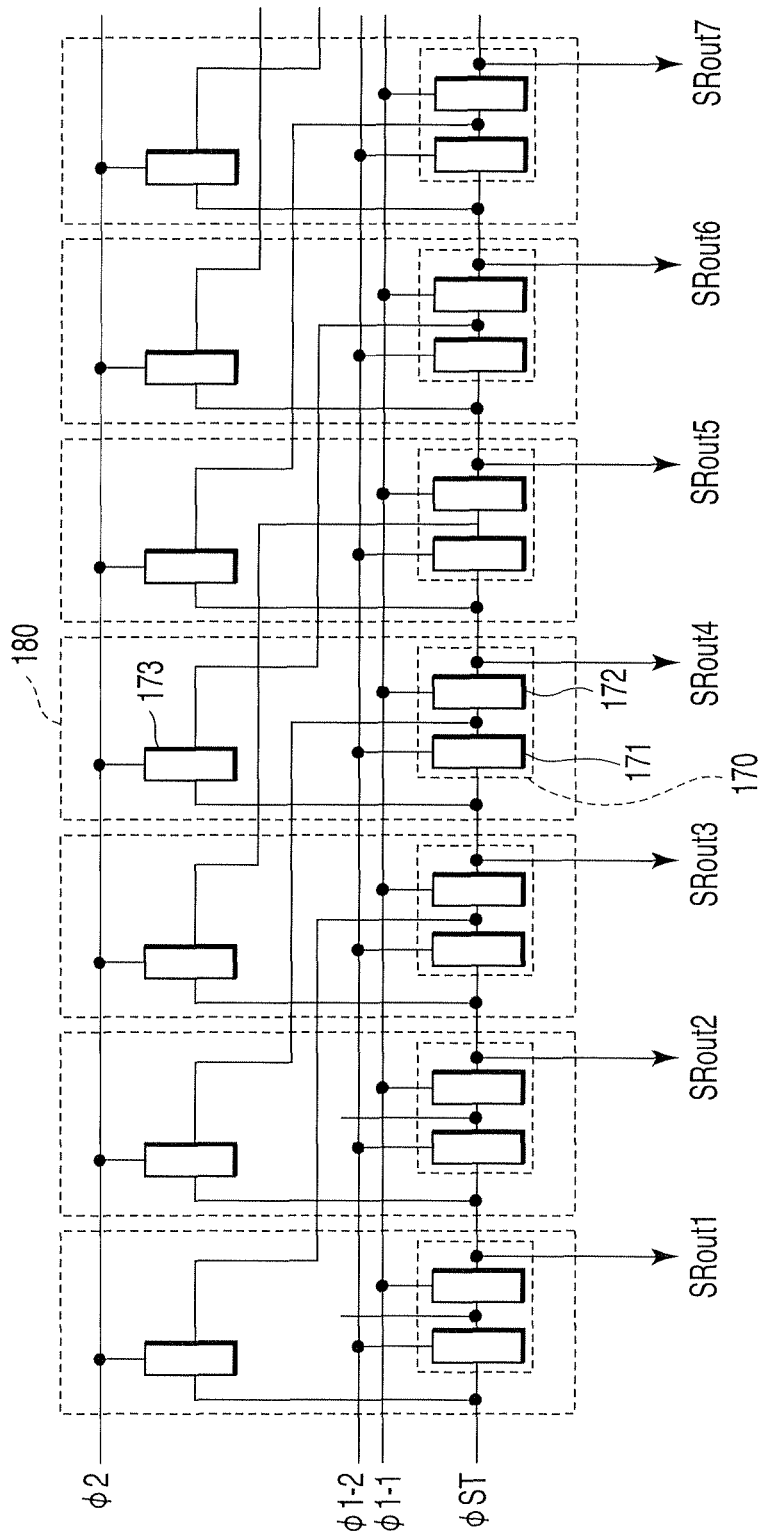
FIG. 23 is a configuration example of a shift register which can be applied as a scanning circuit for carrying out progressive scanning and skip scanning in the solid-state imager apparatus according to the second embodiment of the invention.

Here, a configuration example of a shift register used for a scanning circuit for carrying out progressive scanning and skip scanning is shown in FIG. 23, and will be described. In FIG. 23, a shit register unit 180 of one stage is configured by a first shift register unit 170 comprising sub units 171 and 172 and a second shift register unit 173. Input terminals of the first and second shift register units 170 and 173 are connected in common. Further, the output terminal of the first shift register unit 170 is connected to the input terminal of the shift register unit at the next stage, and the output terminal of the second shift register unit 173 is connected to the input terminal of the sub unit 172 at a stage which is two stages later. Then, the sub units 171 and 172 of the first shift register unit are respectively driven by driving pulses $\phi$1-1 and $\phi$1-2, and the second shift register unit 173 is driven by a driving pulse $\phi$2.

Figure 24:
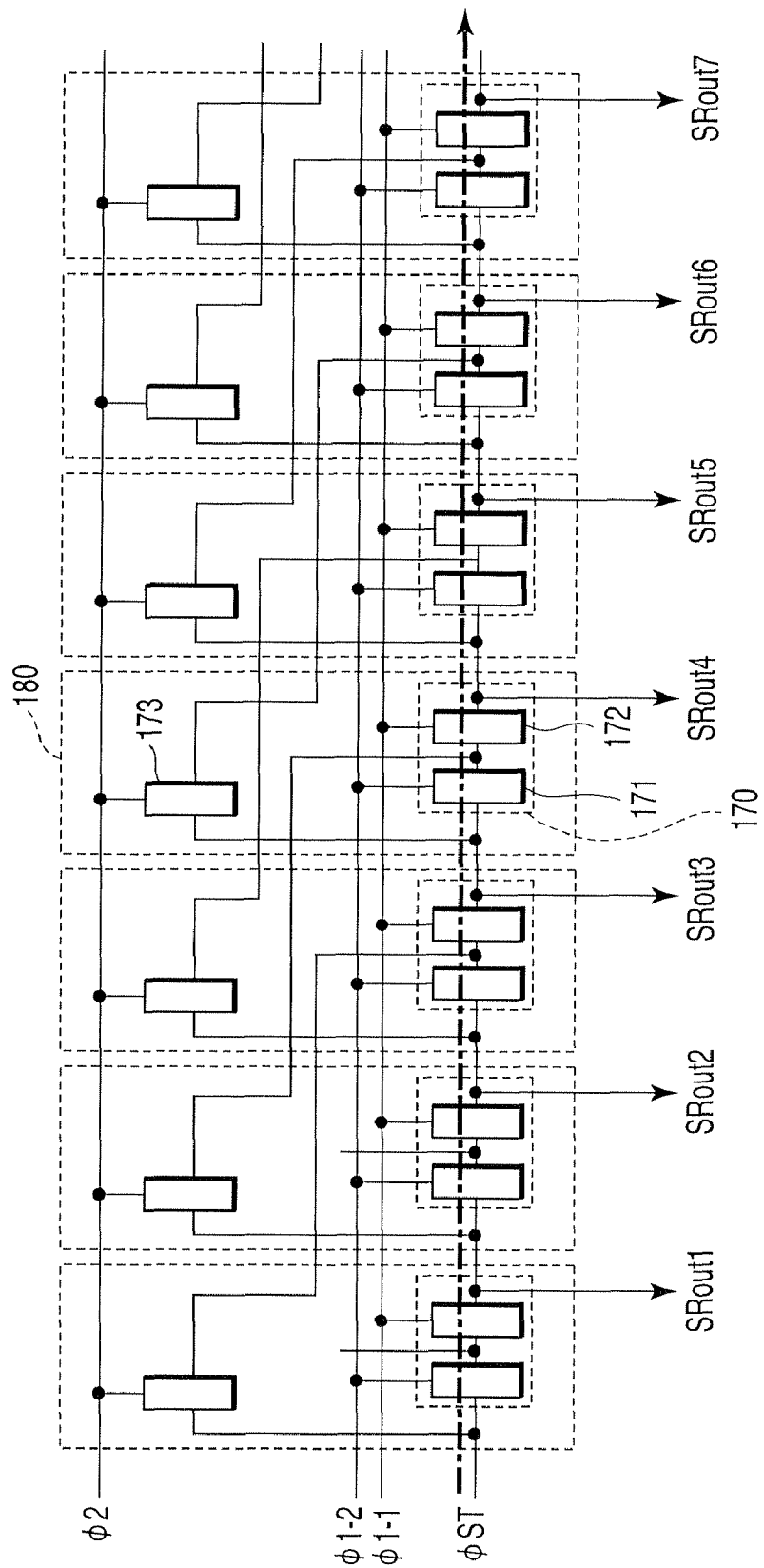
FIG. 24 is a conceptual diagram for explanation of progressive scanning in accordance with the configuration of FIG. 23.

In the shift register having such a configuration, provided that driving signals are applied to the driving pulses $\phi$1-1 and $\phi$1-2, and the driving pulse $\phi$2 is made to be in a state in which the second shift register unit 173 is made to not operate. In this case, when a start pulse $\phi$ST of the shift register is inputted, because the input signal shifts in the shift register as shown by the alternate long and short dash line in FIG. 24, signals are outputted in order of SRout1, SRout2, SRout3, . . . , and progressive scanning can be carried out.

On the other hand, in the shift register, provided that driving signals are applied to the driving pulses $\phi$1-2 and $\phi$2, and the driving pulse $\phi$1-1 is made to be in a state in which the sub unit 171 is made to not operate. In this case, when a start pulse φST of the shift register is inputted, because the input signal shifts in the shift register as shown by the alternate long and short dash line in FIG. 25, signals are outputted in order of SRout3, SRout6, and . . . , and ⅓ interlace scanning can be carried out.

As described above, due to a shift register having a configuration as that of FIG. 23 being used as a scanning circuit, it is possible to switch the progressive scanning and the skip scanning. Note that, because switching of the progressive scanning and the skip scanning can be carried out by controlling the driving pulses, it is possible to switch the progressive scanning and the interlace scanning on the way of scanning by changing a driving pulse on the way of scanning, and the scanning in which such that progressive scanning is carried out onto the shading pixel region and interlace scanning is carried out onto the effective pixel region is possible.

Third Embodiment

First, the outline of a third embodiment of the present invention will be described. In the third embodiment, at the time of driving the solid-state imager apparatus having a pixel portion in which a plurality of pixel cells respectively having a function of converting an incident light into electric information are arranged in a matrix form, in addition to a reset action in units of rows in which the pixel cells of the pixel portion are reset in units of rows, a simultaneous reset action in which all of the pixel cells of the pixel portion are simultaneously reset in units of rows is used, and these two reset methods are used while appropriately switching those. In accordance therewith, a delay at the time of fetching a still image can be reduced. Further, the circuit configuration for carrying out the simultaneous reset action can be achieved by merely adding a simple circuit.

Concretely, for example, in a case of photographing a still image, first, a simultaneous reset action for all the pixel cells is carried out in a state in which a mechanical shutter is fully open, and the exposure is completed by closing the mechanical shutter. Thereafter, operations of reading signals from the pixel cells are carried out in units of rows.

Hereinafter, the third embodiment of the present invention will be described in detail with reference to the drawings. FIG. 26 is a diagram showing a configuration of a MOS type solid-state imager apparatus according to the third embodiment of the invention. The solid-state imager apparatus of the embodiment has a pixel portion 201 configured such that a plurality of pixel cells PIX 211 to PIX 233 are arranged in the matrix directions (here, only nine pixel cells of the PIX 211 to the PIX 233 are shown in order to simplify the explanation), a vertical scanning circuit 202 used for selecting a row of reading pixels, an electric shutter scanning circuit 203 used for determining a start of exposure, a multiplexer 204 for outputting one of the output of the vertical scanning circuit 202 and the output of the electric shutter scanning circuit 203, a noise suppressing circuit 205 for suppressing a noise included in the signal read out in the vertical signal lines V1 to V3, a horizontal scanning circuit 206 for fetching the signals from the noise suppressing circuit 205 by selectively turning horizontal selecting switches M201 to M203 on and off, an output amplifier 207 for amplifying the fetched signals, and a source of current (load of pixel cells) 209 for generating electric current supplied to the pixel portion 201.

Reference numeral 208 denotes a power supply line for the pixel cells (VDDCEL), reference numeral 210 denotes a pulse line for turning the source of current 209 on and off (LGCEL), reference numeral 211 denotes a reading reset pulse line (RST), reference numeral 212 denotes a reading transfer pulse line (TR), reference numeral 213 denotes an electronic shutter reset pulse line (ERST), reference numeral 214 denotes an electronic shutter transfer pulse line (ETR), reference numeral 215 denotes a pulse line for fetching the outputs of the vertical scanning circuit 202 and the electronic shutter scanning circuit 203 (VDRRS), reference numeral 216 denotes a simultaneous reset pulse line (ARST), and reference numeral 217 denotes a simultaneous reset power supply (MPXDD).

Further, φV1 to φv3 are reading row selecting lines, φVE1 to φVE3 are electronic shutter row selecting lines, φRST1 to φRST3 are pixel reset pulse lines, φTR1 to φTR3 are pixel transfer pulse lines, V1 to V3 are vertical signal lines, φH1 to φH3 are column selecting lines, and OUT is a sensor output line.

Figure 27:
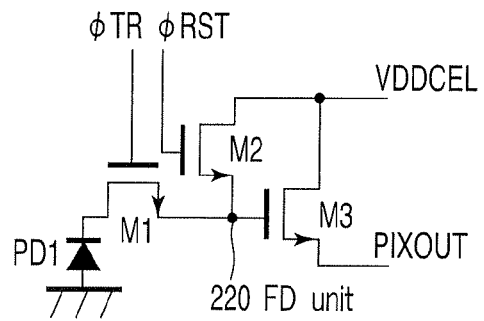
FIG. 27 is a diagram showing a concrete configuration of respective pixel cells PIX11 to PIX33 shown in FIG. 26.

FIG. 27 is a diagram showing a concrete configuration of the respective pixel cells PIX211 to PIX233 shown in FIG. 26, and is configured of a photodiode PD1 for converting an incident light into electric information, a transfer transistor M1, a reset transistor M2, and a pixel amplifier transistor M3. φRST is a pixel reset pulse line, φTR is a pixel transfer pulse line, VDDCEL is a power supply line for pixel cells, PIXOUT is an output line for pixels. Reference numeral 220 denotes a floating diffusion (Floating Diffusion, hereinafter called an FD) unit.

Figure 28A:
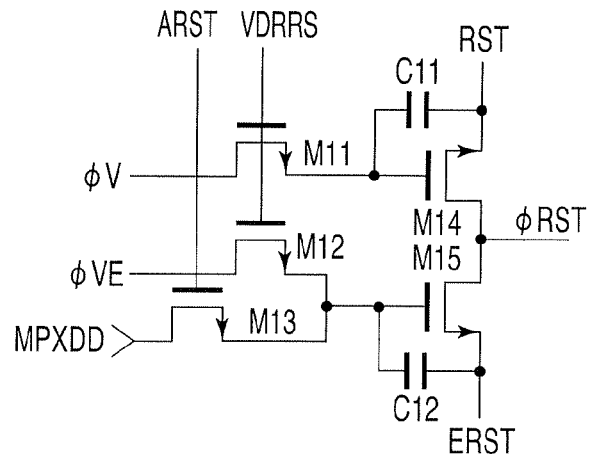
FIGS. 28A and 28B are diagrams showing concrete configurations of a multiplexer 204 shown in FIG. 26.
Figure 28B:
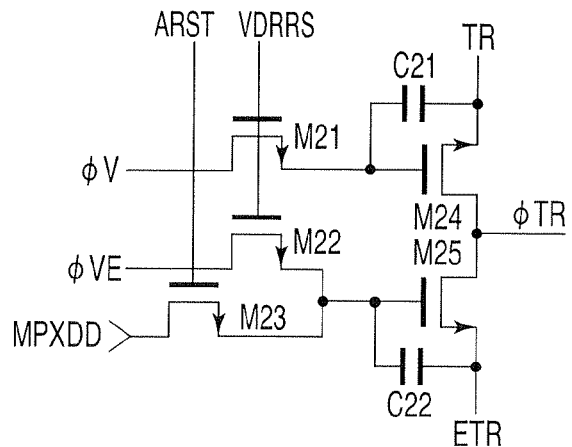

FIGS. 28A and 28B are diagrams showing concrete configurations of the multiplexer 204 shown in FIG. 26, and the multiplexer 204 is configured of a pair of a pixel reset pulse output circuit (FIG. 28A) and a pixel transfer pulse output circuit (FIG. 28B) having a same configuration as the pixel reset pulse output circuit. The configuration of the actual multiplexer has a number of rows in the pixel portion of such configurations. M11 and M21 are transistors for fetching the output of the vertical scanning circuit 202, M12 and M22 are transistors for fetching the output of the electronic shutter scanning circuit 203, M13 and M23 are transistors for setting simultaneous reset, M14 is a reading reset pulse output transistor, M15 is an electronic shutter reset pulse output transistor, M24 is a reading transfer pulse output transistor, M25 is an electronic shutter transfer pulse output transistor, and C11 to C12, and C21 to C22 are capacitances. Further, RST is a reading reset pulse, ERST is an electronic shutter reset pulse, TR is a reading transfer pulse, ETR is an electronic shutter transfer pulse, VDRRS is a scanning circuit output fetching pulse, ARST is a simultaneous reset pulse, MPXDD is a simultaneous reset power supply, φV is a reading row selecting line, φVE is an electronic shutter row selecting line, φRST is a pixel reset pulse line, φTR is a pixel transfer pulse line.

Here, suppose that the simultaneous reset pulse line ARST and the simultaneous reset power supply MPXDD are connected to all the rows of the multiplexer 204. Further, the simultaneous reset pulse line ARST, the simultaneous reset power supply MPXDD, and the simultaneous reset setting SW transistor M13 which are connected to the φVE side are portions added for realizing the simultaneous reset action, and operate independently of the scanning circuit.

In the embodiment, because the transistors used for configuring the respective pixel cells and the multiplexer 204 is configured of only one type transistors (N channel MOS transistors), the number of manufacturing processes can be reduced.

Hereinafter, the reset action and the reading operation for the pixel cells of FIG. 27 will be described. First, the reset action for the pixel cells will be described. The power supply line for the pixel cells VDDCEL (208 in FIG. 26) is set to the "H" level. Next, when the LGCEL (210 in FIG. 26) is set to the "H" level, an electric current is supplied to the respective pixel cells PIX211 to PIX233, and the MOS type solid-state imager apparatus is made to be in an operating mode. When the M2 is turned on by the φRST, the FD unit 220 is set to the "H" level which is the same as the VDDCEL. Next, after the M2 is turned off by the φRST, when the M1 is turned on by the φTR, electric charge accumulated in the PD1 is transferred to the FD unit 220 via the M1. In accordance therewith, the electric charge in the PD1 is cleared, and a reset action is carried out. Thereafter, the M1 is turned off by the φTR, and the PD1 is made to be in a state of accumulating electric charge, and the reset action is completed.

Further, after the VDDCEL is set to the "L" level, when the reset transistor M2 is turned on by the φRST, the FD unit 220 is set to the "L" level which is the same as the VDDCEL. Next, the FD unit 220 maintains to be at the "L" level due to the M2 being turned off by the φRST, and in accordance therewith, the pixel cells are made to be in a state of non-operating. A light which is incident in this state is accumulated as electric information in the PD1.

Next, reading operation for the pixel cells will be described. First, the VDDCEL is set to the "H" level. Next, the FD unit 220 is set to the "H" level which is the same as the VDDCEL due to the M2 being turned on by the φRST.

Next, after the M2 is turned off by the φRST, the M1 is turned on by the φTR, and the electric charge accumulated in the PD1 is transferred to the FD unit 220. Thereafter, the M1 is turned off by the φTR, and the transmission is completed.

The electric charge in the FD unit 220 is outputted as a voltage to the output line for the pixels PIXOUT via the M3. Next, the VDDCEL is set to the "L" level, the M2 is turned on by the φRST, and the PD unit 220 is set to the "L" level which is the same as the VDDCEL. Thereafter, the FD unit 220 is made to be maintained to be at the "L" level due to the M2 being turned off by the φRST. At this point in time, the reading of the signals from the pixels is completed.

The operations of the multiplexer 204 of FIGS. 28A and 28B will be described. As described above, both of FIGS. 28A and 28B have the same configurations, and because the operations thereof are substantially same, only the operation of the pixel reset pulse output circuit of FIG. 28A will be described here. When a level of the φV inputted in a state in which the RST is made to be at the "L" level is at, for example, the "H" level, when the M11 is turned on by the VDRRS, signals at the "H" level of the φV are accumulated in the capacitance C11. At that time, because the M14 is turned on, the reading reset pulse RST is outputted as is to the φRST. In the same way even after the M11 is turned off by the VDRRS, the RST is outputted to the φRST. Here, when the RST is at the "H" level, the "H" level is inputted to the φRST of the pixel cell on a specific row, and the reset action for the pixel cells described above is executed with respect to the pixel cells on the specific row.

On the other hand, when the φV is at the "L" level, signals at the "L" level are accumulated in the capacitance C11. In this case, because the M14 is being turned off, the RST is not outputted to the φRST even if the RST is at any signal level.

Although the φV was described, the description of the φVE is in the same way. In this way, only when the φV and the φVE are at the "H" level, the RST or the ERST is outputted to the φRST.

Further, when the ARST is set to the "H" level in a state in which the ERST is made to be at the "L" level, the M13 is turned on, signals at the "H" level of the MPXDD are stored in the C12s on all the rows. At this time, the M15 is turned on, and the ERST is outputted as is to the φRST. Even after the M13 is turned off by the ARST, the ERST is outputted to the φERST in the same way. Here, when the ERST is at the "H" level, the "H" level is inputted to the φRSTs of the pixel cells on all the rows, and the reset action for the pixel cells described above is carried out with respect to all the pixels simultaneously.

In the present embodiment, there is provided the feature that the reset action in units of rows described above and the all the pixels simultaneous reset action are executed while being switched by selectively driving the ARST and the VDRRS (for example, the all the pixels simultaneous reset action is carried out in a case of photographing a still image, and the reset action in units of rows is carried out in a case of photographing a moving picture.

Hereinafter, such two types of reset actions will be described in detail with reference to the timing charts of FIGS. 29 to 31.

Figure 29:
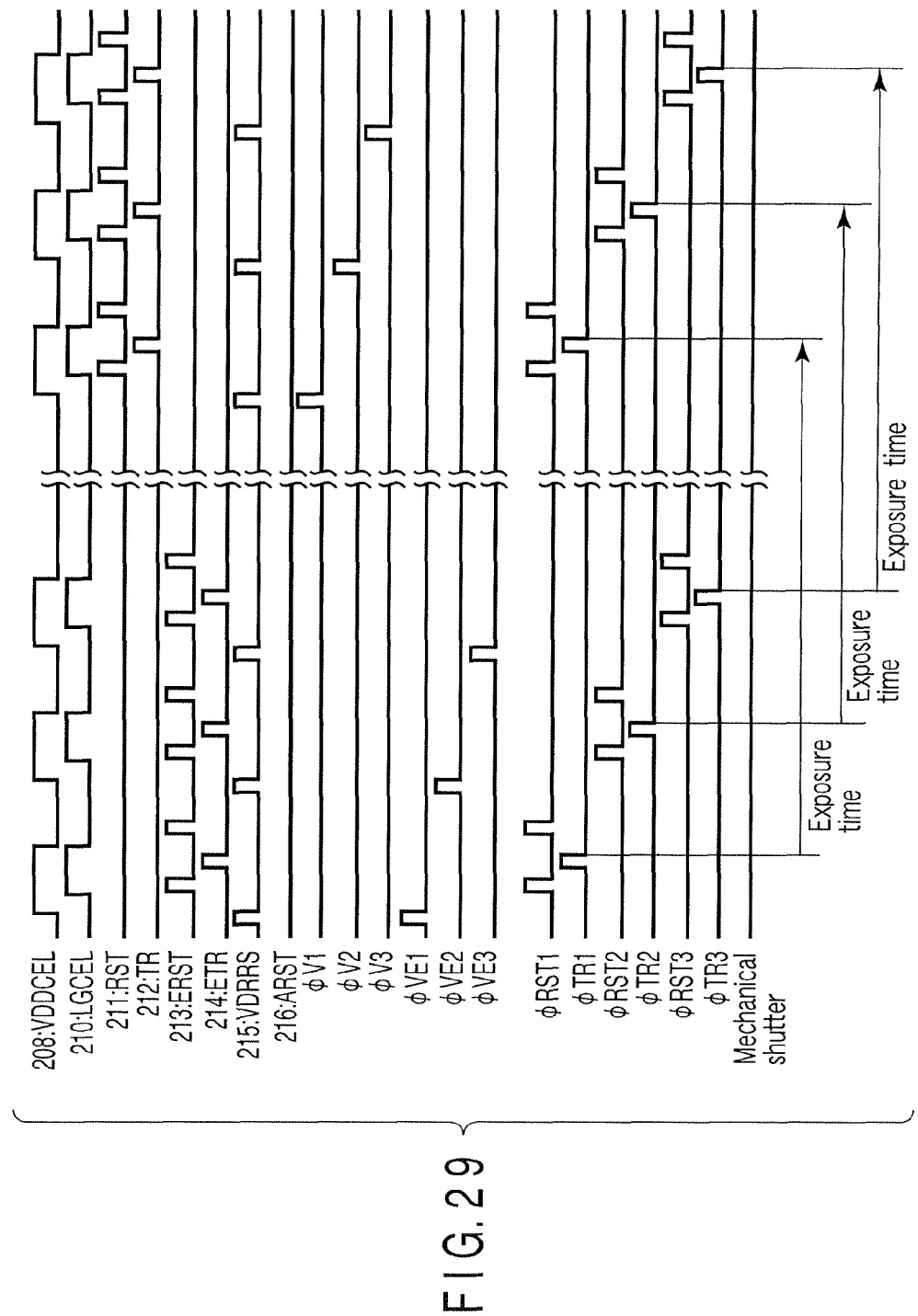
FIG. 29 is a timing chart for explanation of reset actions in units of rows.
Figure 30:
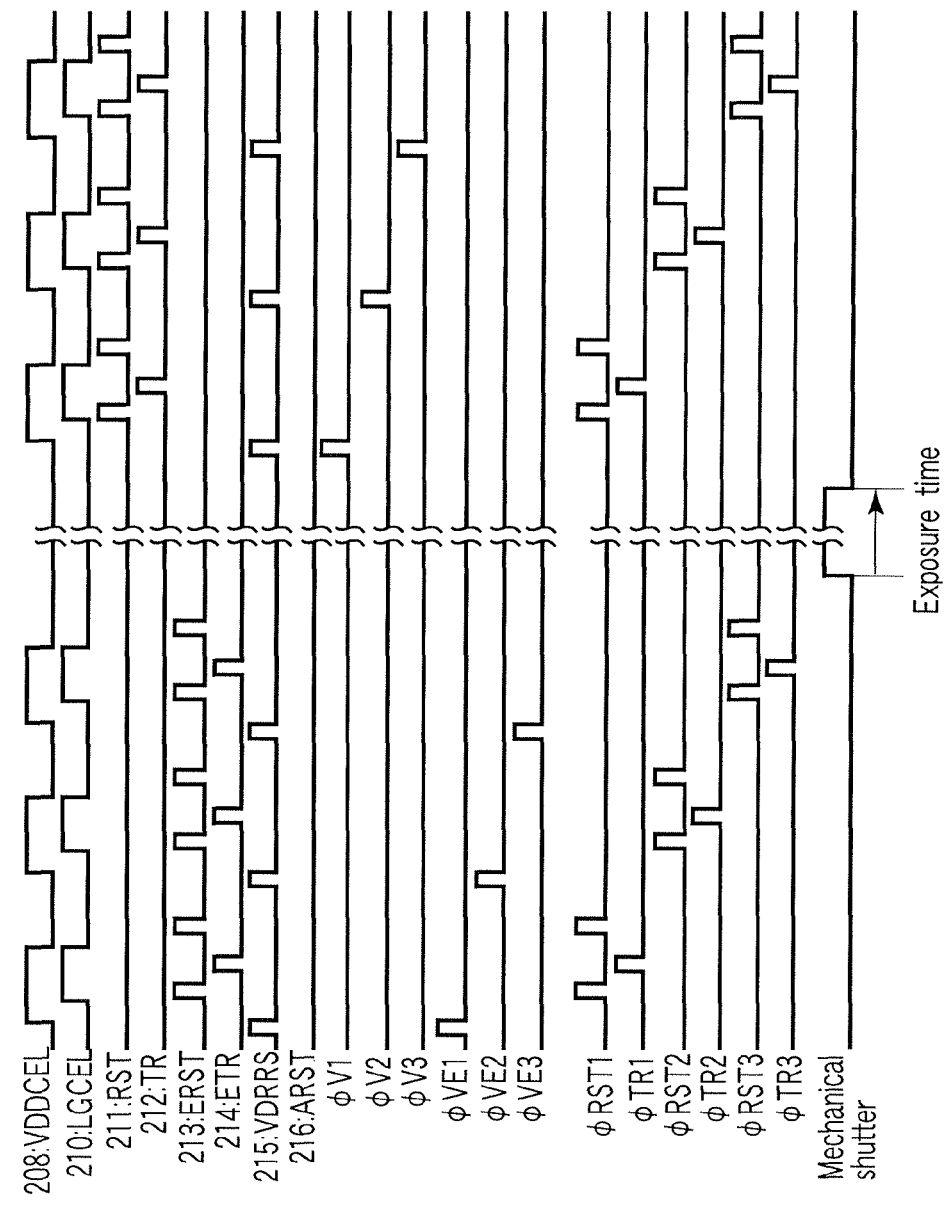
FIG. 30 is a timing chart for explanation of another example of reset actions in units of rows.

FIG. 29 is the timing chart for explanation of the reset action in units of rows, and shows signal waveforms appearing in the respective signal lines. In FIG. 29, there are shown the waveforms of the VDDCEL (power supply line for pixel cells), the LGCEL (load pulse line for pixel cells), the RST (reading reset pulse line), the TR (reading transfer pulse line), the ERST (electronic shutter reset pulse line), the ETR (electronic shutter transfer pulse line), the VDRRS (pulse line for fetching the outputs of the vertical scanning circuit), the ARST (simultaneous reset pulse line), the φV1, the φV2, and the φV3 (reading row selecting lines), the φVE 1, the φVE2, and the φVE3 (electronic shutter selecting lines), the φRST1, the φRST2, and the φRST3 (pixel reset pulse lines for each row), the φTR1, the φTR2, and the φTR3 (pixel transfer pulse lines for each row), and a mechanical shutter output.

As shown by the φRST1, the φRST2, the φRST3, and the φTR1, the φTR2, the φTR3, reading and reset for the signals from the pixel cells are carried out in timings different in each row. In this case, exposure times in the respective rows are determined so as to be the same. However, the exposure starting timings are different from each other.

Then, in order to make the exposure starting timings coincide with one another, it has been carried out that, after the reset actions in all the rows are completed, an exposure timing is determined so as to be synchronous with a open/close timing of a mechanical shutter (here, a focal-plane shutter or a lens shutter). FIG. 30 shows the operation at that time.

However, in a method in which exposures with respect to the pixel cells in the respective rows are carried out in a same timing by using the reset action in units of rows and the mechanical shutter together, because the exposures are carried out after the reset actions with respect to all the pixel cells, there is the problem of a delay in a time from a start of the reset action to the time when the mechanical shutter is fully opened, in particular, in a case of fetching a still image. Then, here, by using the simultaneous reset action for all the pixel cells, in a case of photographing a still image, all pixel cell simultaneous reset is carried out.

FIG. 31 is a timing chart for explanation of a driving timing according to the embodiment for which a simultaneous reset is used, and the reset action is carried out onto all pixel cells simultaneously, and an operation of reading signals from the pixels is carried out in units of rows as shown in FIG. 29. Because the names of the respective lines are as those described in FIG. 29, descriptions thereof will be omitted here.

First, in a state in which the ERST and the ETR are made to be at the "L" level, the M13 and the M23 are turned on with respect to all the rows due to the ARST being made to be at the "H" level, and signals at the "H" level are accumulated in the C12 and C22. In accordance therewith, the M15 and the M25 are already in an ON-state. Next, the ARST is made to return to be at the "L" level, and the M13 and the M23 are turned off.

Thereafter, after the VDDCEL or a bias supply is set to the "H" level, the ERST is made to be at the "H" level. This ERST is outputted to the φRST via the M15 which has been in an ON-state, and the φRSTs of the pixel cells on all the rows are set to the "H" level. In accordance therewith, the M2 is turned on, and the FD units 220 of all the pixel cells are raised to the VDDCEL level (here, the "H" level).

Thereafter, the ERST is made to return to the "L" level, and the φRSTs of the pixel cells on all the rows are made to be at the "L" level, and due to the M2 being turned off, the FD units 220 of all the pixel cells are maintained to be at the "H" level. Continuously, due to the ETR being made to be at the "H" level, the φTRs of the pixel cells on all the rows are set to the "H" level. In this state, the electric charge accumulated in the PD1 is transferred to the FD units 220 via the M1, and due to the electric charge in the PD1 being cleared, simultaneous reset action for all the pixel cells is carried out.

Thereafter, due to the ETR pulse being made to return to the "L" level, the φTRs of the pixel cells on all the rows are made to be at the "L" level, and the M1 is turned off, and the PD1 is made to be in a state of accumulating electric charge, and the simultaneous reset action is completed.

Next, after the VDDCEL or the bias supply is set to the "L" level, the ERST is made to be at the "H" level from the electronic shutter scanning circuit 203. This ERST is outputted to the φRST via the M15 which has been in an ON-state, and the φRSTs of the pixel cells on all the rows are set to the "H" level. In accordance therewith, the M2 is turned on, and the FD units 220 are made to be at the "L" level. Next, due to the ERST being made to return to the "L" level, the φRSTs of the pixel cells on all the rows are made to be at the "L" level, the M2 is turned off, the FD units 220 are maintained to be at the "L" level, and all the pixel cells are made to be in a stand-by state.

The exposure terminations of all the pixel cells are in a same timing by closing the mechanical shutter. Thereafter, the routine proceeds to a reading operation from the pixel cells. However, in this case, the reading operation is carried out for each row. First, in the first row, the M11 and the M21 are turned on by the VDRRS, and the output φV1 of the vertical scanning circuit 202 is fetched into the C11 and the C21 of the multiplexer 204. In this case, the φV2 and the φV3 are not driven. Accordingly, because the "H" level of the RST is outputted to the φRST1 in the first row and the M2 is turned on, only the FD units 220 of the pixel cells in the first row are raised to the VDDCEL. Thereafter, after the RST is made to return to the "L" level, the TR is set to the "H" level, and this is outputted to the φTR and the M1 is turned on, so that the electric charge in the PD1 in the first row is transferred to the PD220 via the M1. Thereafter, when the TR is made to return to the "L" level, the transferred electric charge is outputted as a voltage to the PIXOUT as the pixel signal. The pixel signal is transferred to the noise suppressing circuit 205 via the V1 to the V3. Thereafter, the VDDCEL is set to the "L" level, and due to the RST being made to return to the "L" level after the "H" level is set to the RST, the FD units 220 are maintained to be at the "L" level, and the pixel cells in the first row are made to be in a stand-by state. The output from the noise suppressing circuit 205 is read out to the sensor output line OUT via the horizontal scanning circuit 206 and the output amplifier 207.

After the pixel signals in the first row of the pixel portion 201 are read in this way, next, the pixel signals in the second row of the pixel portion 201 are read. However, at this time, the same operation is repeated in response to the signal of the φV2, and the pixel signals of the pixel cells in the second row are read. With respect to the third row, the pixel signals of the pixel cells in the third row are read in response to the signal of the φV3.

Figure 33A:
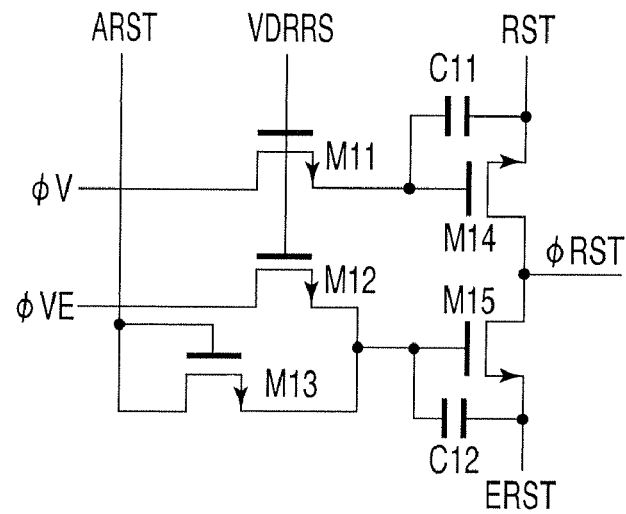
FIGS. 33A and 33B are diagrams showing configurations of the multiplexer 204 corresponding to the configuration of FIG. 32.
Figure 33B:
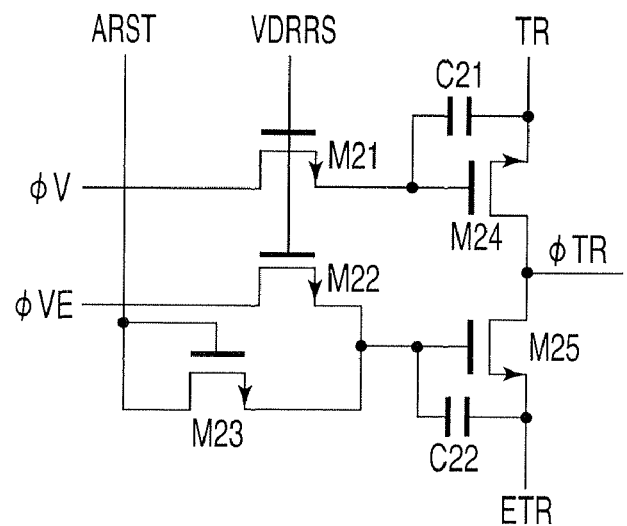

FIG. 32 is a diagram showing a configuration of a MOS type solid-state imager apparatus according to a modified example of the present invention. FIGS. 33A and 33B are diagrams showing configurations of the multiplexer 204 corresponding to the configuration of FIG. 32. In this modified example, it is configured such that some of the multiplexer shown in FIG. 28A and FIG. 28B are changed. However, the basic operations are the same as those of the multiplexer in FIG. 28A and FIG. 28B. Concretely, a drain of the M13 (and the M23) is connected to, not the MPXDD, but the ARST. In accordance therewith, the MPXDD can be fallen into disuse. In the M13 (and the M23) having such a configuration, electrical continuity only in one-way is possible, and the signal of the ARST can be transferred to the C12 (and the C22) only when the ARST is at the "H" level. When the ARST is at the "L" level, the M13 (and the M23) is made to be in an open-state In accordance with the present invention, because the reset action in units of rows and the simultaneous reset action are executed while appropriately switching those, a delay at the time of fetching an image can be reduced.

Further, in accordance with the present invention, the simultaneous reset action can be executed by adding a simple circuit configuration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An XY address type solid-state imager apparatus comprising a solid-state imager having a plurality of pixels two-dimensionally arranged and horizontal and vertical scanning circuits to read signals of the pixels, wherein the scanning circuits each have a progressive scanning circuit to progressively read out pixel signals by a first scanning control signal and an interlace scanning circuit to read pixel signals with an interlaced manner by a second scanning control signal different from the first scanning control signal, the XY address type solid-state imager apparatus arbitrarily carries out combining of progressive reading and interlace reading in one frame in accordance with a combination of the respective scanning control signals, and reads pixel signals, and the scanning circuits each are configured such that shift register circuits which are unit stages are connected in multiple stages, each register circuit further has a plurality of information transmitting units which transmit information by separate clocks and a storage unit which stores an output of each shift register circuit, and an arbitrary area in one frame is read by starting scanning based on the information stored in the storage unit.

2. A camera comprising:

a solid-state imager having a plurality of pixels two-dimensionally arranged;

horizontal and vertical scanning circuits which have a progressive scanning circuit to progressively read pixel signals by a first scanning control signal, and an interlace scanning circuit to read pixel signals with an interlaced manner by a second scanning control signal different from the first scanning control signal;

a scanning control unit which outputs the first scanning control signal and the second scanning control signal; and a mode switching unit which switches to a predetermined mode, wherein the camera arbitrarily carries out combining of progressive reading and interlace reading in one frame in accordance with a combination of the first and second scanning control signals on the basis of a setting of the mode switching unit, and reads pixel signals, and the scanning circuits each have a storage unit which stores outputs of shift register circuits, and read an arbitrary area in one frame by starting scanning based on information stored in the storage unit.

* * * * *